United States Patent
Dong et al.

(10) Patent No.: US 10,873,427 B2
(45) Date of Patent: Dec. 22, 2020

(54) MESSAGE TRANSMISSION METHOD, USER DEVICE, BASE STATION, AND COMPUTER STORAGE MEDIUM

(71) Applicants: CHINA MOBILE COMMUNICATION LTD., RESEARCH INSTITUTE, Beijing (CN); CHINA MOBILE COMMUNICATIONS CORPORATION, Beijing (CN)

(72) Inventors: Jing Dong, Beijing (CN); Lijie Hu, Beijing (CN); Xueying Hou, Beijing (CN); Xiaodong Shen, Beijing (CN)

(73) Assignees: China Mobile Communications Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 16/324,224

(22) PCT Filed: Aug. 11, 2017

(86) PCT No.: PCT/CN2017/097181
§ 371 (c)(1),
(2) Date: Feb. 8, 2019

(87) PCT Pub. No.: WO2018/028691
PCT Pub. Date: Feb. 15, 2018

(65) Prior Publication Data
US 2019/0260520 A1 Aug. 22, 2019

(30) Foreign Application Priority Data

Aug. 11, 2016 (CN) .......................... 2016 1 0659151

(51) Int. Cl.
*H04W 72/12* (2009.01)
*H04L 1/18* (2006.01)
(Continued)

(52) U.S. Cl.
CPC .......... *H04L 1/1887* (2013.01); *H04L 1/1621* (2013.01); *H04L 1/1893* (2013.01);
(Continued)

(58) Field of Classification Search
CPC combination set(s) only.
See application file for complete search history.

(56) References Cited

U.S. PATENT DOCUMENTS

2012/0281678 A1* 11/2012 Chin ................. H04W 56/0005
370/335
2013/0040652 A1* 2/2013 Jiang ................... H04L 27/2624
455/452.1

(Continued)

FOREIGN PATENT DOCUMENTS

CN 101425840 A 5/2009
CN 101442338 A 5/2009

(Continued)

OTHER PUBLICATIONS

International Search Report issued in PCT/CN2017/097181, dated Oct. 27, 2017.

(Continued)

*Primary Examiner* — Fahmida S Chowdhury
(74) *Attorney, Agent, or Firm* — BakerHostetler

(57) ABSTRACT

Disclosed in the present application are a message transmission method, user device, base station, and computer storage medium, the method comprising: receiving uplink authorisation information or re-transmission indication information sent by a base station side; on the basis of the serial number of the downlink sub-frame carrying the uplink authorisation (Continued)

information or re-transmission indication information, determining a corresponding at least one sub-frame time delay, and on the basis of the at least one sub-frame time delay, determining at least one uplink resource; the uplink resource being an uplink sub-frame and/or an uplink pilot time slot in a special sub-frame; and implementing uplink shared channel transmission in the at least one uplink resource.

19 Claims, 7 Drawing Sheets

(51) Int. Cl.
*H04L 1/16* (2006.01)
*H04W 72/04* (2009.01)
*H04W 72/14* (2009.01)
*H04L 5/00* (2006.01)

(52) U.S. Cl.
CPC .............. *H04L 5/00* (2013.01); *H04W 72/04* (2013.01); *H04W 72/0446* (2013.01); *H04W 72/1268* (2013.01); *H04W 72/1289* (2013.01); *H04W 72/14* (2013.01)

(56) References Cited

U.S. PATENT DOCUMENTS

| | | | |
|---|---|---|---|
| 2014/0362798 A1 | 12/2014 | Shu et al. | |
| 2015/0049654 A1 | 2/2015 | Pan et al. | |
| 2015/0181539 A1 | 6/2015 | Aiba et al. | |
| 2015/0280867 A1 | 10/2015 | Han et al. | |
| 2016/0183219 A1* | 6/2016 | Kim | H04W 72/0406 370/329 |
| 2016/0205684 A1* | 7/2016 | Yi | H04W 72/0446 370/336 |
| 2018/0124749 A1* | 5/2018 | Park | H04W 74/08 |

FOREIGN PATENT DOCUMENTS

| | | |
|---|---|---|
| CN | 101895379 A | 11/2010 |
| CN | 103036657 A | 4/2013 |
| CN | 103326840 A | 9/2013 |
| CN | 103684713 A | 3/2014 |
| JP | 2015512574 A | 4/2015 |
| JP | 2015524187 A | 8/2015 |
| WO | 2013/091239 A1 | 6/2013 |
| WO | 2015045731 A1 | 4/2015 |
| WO | 2015196460 A1 | 12/2015 |

OTHER PUBLICATIONS

English translation of Written Opinion issued in PCT/CN2017/097181, dated Oct. 27, 2017.
"Clarification on additional SC-FDMA symbols in UpPTS for SRS" ZTE, Qualcomm, NEC, 3GPP TSG-RAN WG1 Meeting #84, R1-161339, St Julian's, Malta, Feb. 15-18, 2016, Feb. 2016, 7 Pages; Internet<URL:http://www.3gpp.org/ftp/tsg_ran/WG1_RL1/TSGR1_84/Docs/R1-161339.zip>.
"Introduction of LC/CE MTC" Ericsson, 3GPP TSG-RAN WG1 Meeting #83, R1-157918, Anaheim, USA, Nov. 15-22, 2015, Dec. 2015, pp. 3-7; Internet<URL:http://www.3gpp.org/ftp/tsg_ran/WG1_RL1/TSGR1_83/Docs/R1-157918.zip>.
"3rd Generation Partnership Project; Technical Specification Group Radio Access Network; Evolved Universal Terrestrial Radio Access (E-UTRA); Physical channels and modulation" 3GPP TS 36.211, V13.1.0, (Release 13), XP051088459, Mar. 2016, 155 Pages.
Extended Search Report issued in European Application No. 17838821.1, dated Jan. 27, 2020.

* cited by examiner

| UL-DL sub-frame configuration | UL-DL switching point period | Serial number of sub-frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 2a

| 0 | 1 | 2 | 3 | 4 | 5 | 6 | 7 | 8 | 9 |
|---|---|---|---|---|---|---|---|---|---|
| D | S | U | U | U | D | S | U | U | D |

FIG. 2b

MESSAGE TRANSMISSION METHOD, USER DEVICE, BASE STATION, AND COMPUTER STORAGE MEDIUM

CROSS-REFERENCE TO RELATED APPLICATIONS

The present application is a National Stage of International Patent Application No. PCT/CN2017/097181, filed on Aug. 11, 2017, and claims benefit of Chinese Patent Application No. 201610659151.7, filed on Aug. 11, 2016, the contents of which are hereby incorporated by reference in their entirety.

TECHNICAL FIELD

The disclosure relates to the information transmission technology in the field of communications, and particularly, to a message transmission method, User Equipment (UE), an Evolved Node B (eNB) and a computer storage medium.

BACKGROUND

The structure of sub-frames having an equal length is adopted for Time Division Long Term Evolution (TD-LTE): each sub-frame is 1 ms long and includes two time slots of 0.5 ms each; and 10 sub-frames form a 10 ms radio frame. A basic Scheduling/Transport Time Interval (TTI) of a TD-LTE system is a sub-frame, i.e., 1 ms. Correspondingly, a TTI gap between a TTI for feedback and a TTI for data transmission is required to be set according to factors such as a data transmission delay and data processing time consumption of a device, and the TTI gap may be usually set to be a time length of four TTIs. In addition, special sub-frames are also introduced into TD-LTE. A special sub-frame consists of three parts, i.e., a Downlink Pilot Time Slot (DwPTS), a Guard Period (GP) and an Uplink Pilot Time Slot (UpPTS).

At present, a special sub-frame proportioning mode of a Time Division Duplex (TDD) frame structure includes special sub-frame proportioning modes 0-9 defined in 3rd Generation Partnership Project (3GPP) TS 36.211 and no Uplink (UL) signaling and data is transmitted in an UpPTS. Hybrid Automatic Repeat reQuest (HARQ) is a combination of Automatic Repeat reQuest (ARQ) and Forward Error Correction (FEC) and is a link adaptation method for an LTE system.

An N-channel stop-and-wait HARQ protocol is adopted for an LTE system. That is, N processes coexist and a stop-and-wait ARQ protocol is adopted for transmission in each process. A sender, after completely sending a data packet, temporally stops to wait for a confirmation message of a receiver, the receiver, upon reception of data, performs error detection on the data, in case of correct reception, feeds back an Acknowledgement (ACK) message to the sender, otherwise, feeds back a Negative Acknowledgement (NACK) message to the sender, and the sender, when receiving an ACK signal, sends new data, otherwise, retransmits the data packet. The N concurrent processes are in a stop-and-wait process, and channel resources may be used for transmission in the other processes.

In a TD-LTE system, a synchronous HARQ technology is adopted for a UL, and for each sub-frame, retransmission is performed at a fixed moment. However, time division multiplexing is adopted for UL and Downlink (DL) transmission and thus it is impossible to find the same and fixed feedback time interval for each sub-frame. For different TDD UL-DL configurations and different sub-frames, time intervals for UL grant scheduling, ACK/NACK feedback and retransmission are all different.

However, in the foregoing system setting, for a time slot proportion of TDD that a number of UL sub-frames is smaller than a number of DL sub-frames, UL transmission resources for TDD are limited, so that a UL transmission data rate and UL transmission spectrum efficiency of a TD-LTE network are seriously limited.

SUMMARY

A main purpose of the disclosure is to disclose a message transmission method, UE, an eNB and a storage medium, so as to solve the foregoing problem in a conventional art.

In order to achieve the purpose, the disclosure provides a message transmission method, which may include the following operations.

UL grant information or retransmission indication information sent from an eNB side is received.

At least one corresponding sub-frame delay is determined on the basis of a serial number of a DL sub-frame containing the UL grant information or the retransmission indication information, and at least one UL resource is determined on the basis of the at least one sub-frame delay, the UL resource being at least one of a UL sub-frame or an UpPTS in a special sub-frame.

A UL shared channel transmission is performed in the at least one UL resource.

The disclosure provides a message transmission method, which may be applied to an eNB and include the following operations.

UL grant information for UE is generated.

A serial number of a DL sub-frame for sending the UL grant information or retransmission indication information is determined, at least one corresponding sub-frame delay is determined on the basis of the serial number of the DL sub-frame, and at least one UL resource is determined on the basis of the at least one sub-frame delay, the UL resource being at least one of a UL sub-frame or an UpPTS in a special sub-frame.

The UL grant information or the retransmission indication information is sent to the UE in the DL sub-frame, and UL shared channel transmission sent from the UE is received in the at least one UL resource.

The disclosure provides UE, which may include a receiving unit, a processing unit and a sending unit.

The receiving unit may be configured to receive UL grant information or retransmission indication information sent from an eNB side.

The processing unit may be configured to determine at least one corresponding sub-frame delay corresponding to a serial number of a DL sub-frame containing the UL grant information or the retransmission indication information and determine at least one UL resource on the basis of the at least one sub-frame delay, the UL resource being at least one of a UL sub-frame or an UpPTS in a special sub-frame.

The sending unit may be configured to perform UL shared channel transmission in the at least one UL resource.

The disclosure provides an eNB, which may include an information generation unit, a management unit and a communication unit.

The information generation unit may be configured to generate UL grant information or retransmission indication information for UE.

The management unit may be configured to determine a serial number of a DL sub-frame for sending the UL grant information or retransmission indication information, determine at least one corresponding sub-frame delay corresponding to the serial number of the DL sub-frame and determine at least one UL resource on the basis of the at least one sub-frame delay, the UL resource being at least one of a UL sub-frame or an UpPTS in a special sub-frame.

The communication unit may be configured to send the UL grant information or the retransmission indication information to the UE in the DL sub-frame and receive, in the at least one UL resource, UL shared channel transmission sent from the UE.

The disclosure provides UE, which may include a processor and a memory configured to store a computer program capable of being run on the processor.

Herein, the processor may be configured to run the computer program to execute the steps of the abovementioned method.

The disclosure provides an eNB, which may include a processor and a memory configured to store a computer program capable of being run on the processor.

Herein, the processor may be configured to run the computer program to execute the steps of the abovementioned method.

The disclosure provides a storage medium having stored thereon a computer program executed by a processor to implement the steps of the abovementioned method.

According to the message transmission method, UE, eNB and storage medium disclosed in the disclosure, the UE, after receiving the DL sub-frame corresponding to the UL grant information or retransmission indication information sent from the eNB, may determine the corresponding UL resource on the basis of the DL sub-frame and the UL resource may particularly include the UpPTS of the special sub-frame, so that more UL resources may be adopted to transmit UL signals. In addition, since the UL resources configured to transmit the UL signals are added, the amount of information born in each UL resource may also be reduced and an effect of ensuring a UL information transmission spectrum is achieved.

BRIEF DESCRIPTION OF DRAWINGS

FIG. 2a is a schematic diagram of a setting corresponding to a sub-frame configuration according to an embodiment of the disclosure.

FIG. 2b is a schematic diagram of a sub-frame configuration according to an embodiment of the disclosure.

DETAILED DESCRIPTION

The disclosure will further be described below in combination with the drawings and specific embodiments in detail.

Embodiment 1

Figure 1:
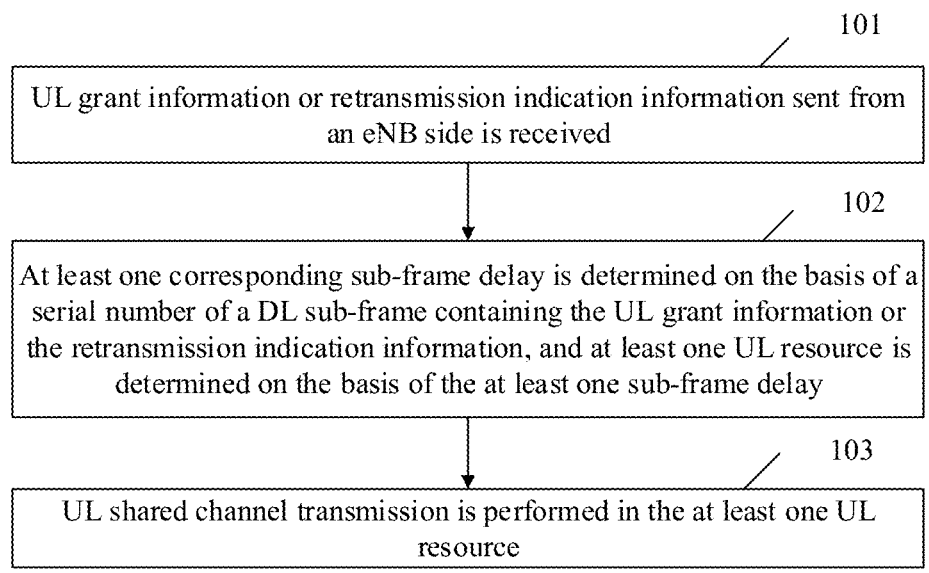
FIG. 1 is a first flowchart of a message transmission method according to an embodiment of the disclosure.

The embodiment of the disclosure provides a message transmission method, which is applied to UE and, as shown in FIG. 1, includes the following steps.

In 101, UL grant information or retransmission indication information sent from an eNB side is received.

In 102, at least one corresponding sub-frame delay is determined on the basis of a serial number of a DL sub-frame containing the UL grant information or the retransmission indication information, and at least one UL resource is determined on the basis of the at least one sub-frame delay, the UL resource being at least one of a UL sub-frame or an UpPTS in a special sub-frame.

In 103, a UL shared channel transmission is performed in the at least one UL resource.

It is to be noted that the solution is for a proportion 6:2:6 of DwPTS:GP:UpPTS in a newly added special sub-frame proportioning mode 10. Specifically, the special sub-frame at least includes the UpPTS and a DwPTS. Herein, the DwPTS includes 13,168 time-domain sampling points. When a normal cyclic prefix is adopted, the UpPTS includes 13,152 time-domain sampling points, or when an extended cyclic prefix is adopted, the UpPTS includes 12,800 time-domain sampling points, and a time interval between two time-domain sampling points is 1/(15,000*2,048) seconds.

Furthermore, in the embodiment, physical resources are also allocated on the basis of determining the at least one UL resource on the basis of the at least one sub-frame delay, specifically further including the following operations.

When the determined UL resource is the UpPTS of the special sub-frame, a number of Physical Resource Blocks (PRBs) allocated in the UpPTS is calculated and an equivalent number of PRBs corresponding to the number of PRBs is calculated, the equivalent number of PRBs being a product of the number of PRBs and a preset coefficient.

A data block size index is searched on the basis of a modulation and coding scheme index and a value of the number of UL data blocks is calculated on the basis of the equivalent number of PRBs and the data block size index.

For example, for Physical Uplink Shared Channel (PUSCH) transmission in the UpPTS, a terminal reads a Resource Indication Value (RIV) for UL resource allocation from a Downlink Control Information (DCI) format for transmission of a UL grant at first and learns about a number of PRBs N_PRB allocated for the terminal through a value of the RIV for resource allocation. Furthermore, the N_PRB is compressed by use of the following possible methods to obtain the equivalent number of PRBs (N_PRB'). The terminal reads I_MCS from the DCI format for transmission of the UL grant, finds I_TBS through I_MCS, finds a corresponding Transport Block Size (TBS) from a TBS table in a protocol on the basis of I_TBS and N_PRB' and then performs subsequent coding, modulation and transmission.

Herein, the equivalent number of PRBs is the product of the number of PRBs and the preset coefficient. There are the following examples for a calculation method for N_PRB'.

A First Example $N'_{PRB}=\lceil \alpha * N_{PRB} \rceil$. In the example, the number of PRBs is equivalent to a relatively large TBS.

A Second Example $N'_{PRB}=\max\{\lfloor \alpha * N_{PRB} \rfloor, 1\}$. In the example, the number of PRBs is equivalent to a relatively small TBS.

If $\alpha * N_{PRB} < 1$, no proper TBS may be found, that is, a code rate may be larger than 1. But this may depend on implementation of the eNB, that is, a numerical value of the allocated N_PRB may be relatively large.

The preset coefficient may be set according to a practical condition. α in the two examples is the preset coefficient. There are the following embodiments for a value of α.

A criterion is α=(N_UpPTS-N_SRS-Up_DMRS)/(14-UL_DMRS), where N_UpPTS is a symbol number of the UpPTS and N_SRS is a symbol number for Sounding Reference Signal (SRS) transmission in the UpPST.

Several specific embodiments about the numerical value: on the basis of the criterion, a few specific embodiments about the numerical value are further provided: α=6/12=0.5, α=5/12=0.417, α=4/12=0.33, α=3/12=0.25, α=2/12=0.17, α=1/12=0.08, α=0.375 and α=0.125.

In the special sub-frame proportioning mode, PUSCH transmission is supported by an UpPTS design. When the UpPTS is configured to transmit an independent data block as an independent transmission resource, a Random Access (RA) process is temporally not considered for design of a UL HARQ time sequence. Therefore, the following time sequences are mainly included:

(1) a time sequence that the eNB, after receiving a Scheduling Request (SR)/Buffer Status Report (BSR), allocates the UL grant and the UE sends data in a PUSCH by use of the UL grant;

(2) a time sequence that the eNB sends a NACK in a Physical HARQ Indicator Channel (PHICH) and the UE receives the PHICH; and (3) a synchronization time sequence that the UE executes UL retransmission.

Furthermore, the following two solutions are adopted for specific design in the embodiment.

A first solution: a HARQ time sequence table is redesigned.

a) An interval between NACK information transmission and data transmission of the UpPTS is not shorter than 4 ms (namely not shorter than a length of four sub-frames).

b) The interval between ACK/NACK information transmission and data transmission of the UpPTS is at least 4*6 Single-Carrier Orthogonal Frequency Division Multiplexing (SC-OFDM) symbols.

A second solution: an UpPTS process is added without changing an existing HARQ time sequence table.

Figure 2B:
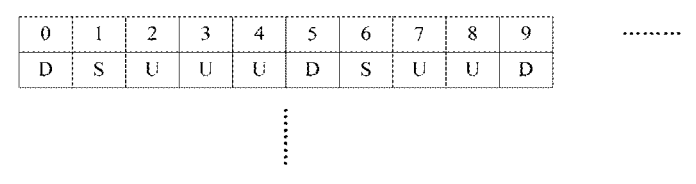

In addition, in the embodiment, different UL-DL configurations are required to be considered for a TDD system. Seven different TDD UL/DL proportions are supported by LTE. As shown in FIG. 2a, seven UL-DL sub-frame configurations shown in the figure are called a UL-DL sub-frame configuration 0 to a UL-DL sub-frame configuration 6. In the figure, D identifies a DL sub-frame, S identifies a special sub-frame and U identifies a UL sub-frame. Moreover, it is to be point out that, in a TD-LTE system, a synchronous HARQ technology is adopted for a UL, and for each sub-frame, retransmission is performed at a fixed moment. However, time division multiplexing is adopted for UL and DL transmission and thus it is impossible to find the same fixed feedback time interval for each sub-frame. For different TDD UL-DL configurations and different sub-frames, time intervals for UL grant scheduling, ACK/NACK feedback and retransmission are all different. As shown in FIG. 2b, there are totally six UL HARQ processes for TDD config. 6, a UL grant of a sub-frame 2 in a first UL process is in a sub-frame 5 of a previous radio frame, an ACK/NACK feedback is in a sub-frame 6 and a retransmitted sub-frame is a sub-frame 3 of a next radio frame.

The operation that the UL grant information sent from the eNB side is received includes that: DCI is parsed, and UL resource indication information and the UL grant information are extracted from the DCI, the UL resource indication information being configured to indicate a UL resource selection rule adopted by the UE.

Herein, the DCI may be in a DCI format 0, the message may be contained in a Physical Downlink Control Channel (PDCCH), the DCI format 0 may contain the UL grant information UL-grant and, furthermore, the UL resource indication information UL-Index may be contained in the UL-grant.

Herein, the operation that the at least one corresponding sub-frame delay is determined on the basis of the serial number of the DL sub-frame containing the UL grant information and the at least one UL resource is determined on the basis of the at least one sub-frame delay includes the following operations.

The adopted UL resource selection rule is determined on the basis of the UL resource indication information, the UL resource selection rule at least including a sub-frame corresponding to the UL resource indication information and at least one sub-frame delay corresponding to each sub-frame.

The at least one UL resource is determined on the basis of the serial number of the DL sub-frame containing the UL grant information and the at least one corresponding sub-frame delay comprised in the UL resource selection rule.

Descriptions about message transmission performed on the basis of the seven UL-DL sub-frame configurations respectively will be made below. Particularly, the descriptions will focus on how to determine, by the UE, the specific sub-frame for transmission of a UL channel. Herein, the UL channel may be a PUSCH. In addition, the UE, when receiving the UL-grant, determines a time sequence for transmission of the PUSCH to be sent to the eNB. The following specific scenarios are included.

A First Scenario

The operation that the adopted UL resource selection rule is determined on the basis of the UL resource indication information is implemented as follows: when a UL-DL sub-frame configuration 1 is adopted, if the DL sub-frame is one of a sub-frame 0, a sub-frame 1, a sub-frame 5 or a sub-frame 6, it is determined that the corresponding sub-frame delay is 6, and if the DL sub-frame is a sub-frame 4 or a sub-frame 9, it is determined that the corresponding sub-frame delay is 4.

When a UL-DL sub-frame configuration 2 is adopted, if the DL sub-frame is the sub-frame 1 or the sub-frame 6, it is determined that the corresponding sub-frame delay is 5, and if the DL sub-frame is a sub-frame 3 or a sub-frame 8, it is determined that the corresponding sub-frame delay is 4.

When a UL-DL sub-frame configuration 3 is adopted, if the DL sub-frame is one of the sub-frame 0, a sub-frame 7, the sub-frame 8 or the sub-frame 9, it is determined that the corresponding sub-frame delay is 4.

When a UL-DL sub-frame configuration 4 is adopted, if the DL sub-frame is one of the sub-frame 7, the sub-frame 8 or the sub-frame 9, it is determined that the corresponding sub-frame delay is 4.

When a UL-DL sub-frame configuration 5 is adopted, if the DL sub-frame is the sub-frame 7 or the sub-frame 8, it is determined that the corresponding sub-frame delay is 4.

That is, k values for the configurations 1-5 may refer to Table 1 (applied to two solutions).

TABLE 1

| UL-DL sub-frame configuration | Serial number of the sub-frame | | | | | | | | | |
|---|---|---|---|---|---|---|---|---|---|---|
| | 0 | 1 | 2 | 3 | 4 | 5 | 6 | 7 | 8 | 9 |
| 1 | 6 | 6 | | | 4 | 6 | 6 | | | 4 |
| 2 | | 5 | | 4 | | | 5 | | 4 | |

TABLE 1-continued

| UL-DL sub-frame configuration | Serial number of the sub-frame | | | | | | | | | |
|---|---|---|---|---|---|---|---|---|---|---|
| | 0 | 1 | 2 | 3 | 4 | 5 | 6 | 7 | 8 | 9 |
| 3 | 4 | | | | | | | 4 | 4 | 4 |
| 4 | | | | | | | | 4 | 4 | 4 |
| 5 | | | | | | | | 4 | 4 | |

It is to be pointed out that a difference between UL transmission in the scenario and the conventional art is that the UL channel may be transmitted in the UpPTS of the special sub-frame and, particularly, the PUSCH may be transmitted in the UpPTS. For example, UL transmission is performed in the sub-frame 1 shown in Table 1.

A Second Scenario

The operation that the adopted UL resource selection rule is determined on the basis of the UL resource indication information includes the following operations.

When a UL-DL sub-frame configuration 0 is adopted, if a Most Significant Bit (MSB) in the UL resource indication information is 1 and a Least Significant Bit (LSB) is 0, or, if a retransmission indicator channel is received in the sub-frame 0 or the sub-frame 5 and a retransmission indicator is 0, the UL resource selection rule is determined to be that, when the DL sub-frame is the sub-frame 0 or the sub-frame 5, the corresponding sub-frame delay is 8.

When the UL-DL sub-frame configuration 0 is adopted, if the MSB in the UL resource indication information is 0 and the LSB is 1, or, if the retransmission indicator channel is received in the sub-frame 0 or the sub-frame 5 and the retransmission indicator is 1, the UL resource selection rule is determined to be that, when the DL sub-frame is the sub-frame 0 or the sub-frame 5, the corresponding sub-frame delay is 9.

When the UL-DL sub-frame configuration 0 is adopted, if the MSB in the UL resource indication information is 1 and the LSB is 1, the UL resource selection rule is determined to be that, when the DL sub-frame is the sub-frame 0 or the sub-frame 5, the corresponding sub-frame delay is 8 and 9.

When the UL-DL sub-frame configuration 0 is adopted, if the MSB in the UL resource indication information is 1 and the LSB is 0, or, if the retransmission indicator channel is received in the sub-frame 1 or the sub-frame 6 and the retransmission indicator is 0, the UL resource selection rule is determined to be that, when the DL sub-frame is the sub-frame 1 or the sub-frame 6, the corresponding sub-frame delay is 10.

When the UL-DL sub-frame configuration 0 is adopted, if the MSB in the UL resource indication information is 0 and the LSB is 1, or, if the retransmission indicator channel is received in the sub-frame 1 or the sub-frame 6 and the retransmission indicator is 1, the UL resource selection rule is determined to be that, when the DL sub-frame is the sub-frame 1 or the sub-frame 6, the corresponding sub-frame delay is 11.

When the UL-DL sub-frame configuration 0 is adopted, if the MSB in the UL resource indication information is 1 and the LSB is 1, the UL resource selection rule is determined to be that, when the DL sub-frame is the sub-frame 1 or the sub-frame 6, the corresponding sub-frame delay is 10 and 11.

For example, for the sub-frame 0, the sub-frame 8 may be scheduled and the sub-frame 9 may also be scheduled. For determining the sub-frame scheduled for it, the following specifications are defined.

For the Sub-Frames 0 and 5

A resource for DCI0 may be used in (n+k) and may also be used in (n+9). A field called UL_INDEX is introduced into the DCI 0 in a protocol. The field UL_INDEX includes only two bits with the following specific meanings.

If MSB=1 and LSB=0, or the PHICH is received in the sub-frame 0 or 5 and, correspondingly, $I_{PHICH}=0$ it is indicated that two interaction parties are required to use a rule of (n+k) and, in such case, a resource of a PUSCH is scheduled for a piece of DCI0.

If MSB=0 and LSB=1, or the PHICH is received in the sub-frame 0 or 5 and, correspondingly, $I_{PHICH}=1$, it is indicated that the two interaction parties are required to use a rule of (n+9) and, in such case, a resource of a PUSCH is scheduled for a piece of DCI0.

If MSB=1 and LSB=1, it is indicated that the two interaction parties are required to use the rules of (n+k) and (n+9) and, in such case, resources of two PUSCHs are simultaneously scheduled for a piece of DCI0.

For the Sub-Frames 1 and 6

A resource for DCI0 may be used in (n+k) and may also be used in (n+1). The field called UL_INDEX is introduced into the DCI 0 in the protocol. The field UL_INDEX includes only two bits with the following specific meanings.

If MSB=1 and LSB=0, or the PHICH is received in the sub-frame 1 or 6 and, correspondingly, $I_{PHICH}=0$, it is indicated that two interaction parties are required to use a rule of (n+k) and, in such case, a resource of a PUSCH is scheduled for a piece of DCI0.

If MSB=0 and LSB=1, or the PHICH is received in the sub-frame 1 or 6 and, correspondingly, $I_{PHICH}=1$, it is indicated that the two interaction parties are required to use a rule of (n+1) and, in such case, a resource of a PUSCH is scheduled for a piece of DCI0.

If MSB=1 and LSB=1, it is indicated that the two interaction parties are required to use the rules of (n+k) and (n+9) and, in such case, resources of two PUSCHs are simultaneously scheduled for a piece of DCI0.

Referring to Table 2, k values for the configuration 0 are illustrated (applied to redesign of the HARQ time sequence table).

TABLE 2

| UL-DL sub-frame configuration | Serial number of the sub-frame | | | | | | | | | |
|---|---|---|---|---|---|---|---|---|---|---|
| | 0 | 1 | 2 | 3 | 4 | 5 | 6 | 7 | 8 | 9 |
| 0 | | 8 | 10 | | | | | 8 | 10 | |

For the UL-DL configuration 0 for TDD, responsive to determining that the UL shared channel transmission is performed in a UL resource of the sub-frame 4 or the sub-frame 2 or the sub-frame 7 or the sub-frame 9, the retransmission indicator is set to be 1, otherwise, the retransmission indicator is set to be 0.

A Third Scenario

The operation that the adopted UL resource selection rule is determined on the basis of the UL resource indication information includes the following operations.

When the UL-DL sub-frame configuration 0 is adopted, if the MSB in the UL resource indication information is 1 and the LSB is 0, or, if the retransmission indicator channel is received in the sub-frame 0 or the sub-frame 5 and the retransmission indicator is 0, the UL resource selection rule is determined to be that, when the DL sub-frame is the sub-frame 0 or the sub-frame 5, the corresponding sub-frame delay is 4.

When the UL-DL sub-frame configuration 0 is adopted, if the MSB in the UL resource indication information is 0 and the LSB is 1, or, if the retransmission indicator channel is received in the sub-frame 0 or the sub-frame 5 and the retransmission indicator is 1, the UL resource selection rule is determined to be that, when the DL sub-frame is the sub-frame 0 or the sub-frame 5, the corresponding sub-frame delay is 6.

When the UL-DL sub-frame configuration 0 is adopted, if the MSB in the UL resource indication information is 1 and the LSB is 1, the UL resource selection rule is determined to be that, when the DL sub-frame is the sub-frame 0 or the sub-frame 5, the corresponding sub-frame delay is 4 and 6.

When the UL-DL sub-frame configuration 0 is adopted, if the MSB in the UL resource indication information is 1 and the LSB is 0, or, if the retransmission indicator channel is received in the sub-frame 1 or the sub-frame 6 and the retransmission indicator is 0, the UL resource selection rule is determined to be that, when the DL sub-frame is the sub-frame 1 or the sub-frame 6, the corresponding sub-frame delay is 6.

When the UL-DL sub-frame configuration 0 is adopted, if the MSB in the UL resource indication information is 0 and the LSB is 1, or, if the retransmission indicator channel is received in the sub-frame 1 or the sub-frame 6 and the retransmission indicator is 1, the UL resource selection rule is determined to be that, when the DL sub-frame is the sub-frame 1 or the sub-frame 6, the corresponding sub-frame delay is 7.

When the UL-DL sub-frame configuration 0 is adopted, if the MSB in the UL resource indication information is 1 and the LSB is 1, the UL resource selection rule is determined to be that, when the DL sub-frame is the sub-frame 1 or the sub-frame 6, the corresponding sub-frame delay is 6 and 7.

Referring to Table 3, k values for the configuration 0 (case 0 & case 1 & case 2) are illustrated (applied to no changes of the existing HARQ time sequence table).

TABLE 3

| UL-DL sub-frame configuration | Serial number of the sub-frame | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |

Specifically, different UL grants are adopted to schedule the PUSCH of the UpPTS and a PUSCH of a UL sub-frame thereafter and at most two PUSCHs are scheduled by a UL grant.

For example, for the sub-frame 0, the sub-frame 4 may be scheduled and the sub-frame 6 may also be scheduled. For determining the sub-frame scheduled for it, the following specifications are defined.

(1) For the sub-frames 0 and 5

A resource for DCI0 may be used in (n+k) and may also be used in (n+6). The field called UL_INDEX is introduced into the DCI0 in the protocol. The field UL_INDEX includes only two bits with the following specific meanings.

If MSB=1 and LSB=0, or the PHICH is received in the sub-frame 0 or 5 and, correspondingly, $I_{PHICH}=0$ it is indicated that two interaction parties are required to use a rule of (n+k) and, in such case, a resource of a PUSCH is scheduled for a piece of DCI0.

If MSB=0 and LSB=1, or the PHICH is received in the sub-frame 0 or 5 and, correspondingly, $I_{PHICH}=1$, it is indicated that the two interaction parties are required to use a rule of (n+6) and, in such case, a resource of a PUSCH is scheduled for a piece of DCI0.

If MSB=1 and LSB=1, it is indicated that the two interaction parties are required to use the rules of (n+k) and (n+6) and, in such case, resources of two PUSCHs are simultaneously scheduled for a piece of DCI0.

For the sub-frames 1 and 6: a resource for DCI0 may be used in (n+k) and may also be used in (n+7). The field called UL_INDEX is introduced into the DCI0 in the protocol. The field UL_INDEX includes only two bits with the following specific meanings.

If MSB=1 and LSB=0, or the PHICH is received in the sub-frame 1 or 6 and, correspondingly, $I_{PHICH}=0$, it is indicated that two interaction parties are required to use a rule of (n+k) and, in such case, a resource of a PUSCH is scheduled for a piece of DCI0.

If MSB=0 and LSB=1, or the PHICH is received in the sub-frame 1 or 6 and, correspondingly, $I_{PHICH}=1$, it is indicated that the two interaction parties are required to use a rule of (n+7) and, in such case, a resource of a PUSCH is scheduled for a piece of DCI0.

If MSB=1 and LSB=1, it is indicated that the two interaction parties are required to use the rules of (n+k) and (n+7) and, in such case, resources of two PUSCHs are simultaneously scheduled for a piece of DCI0.

For the UL-DL configuration 0 for TDD, responsive to determining that the UL shared channel transmission is performed in a UL resource of the sub-frame 1 or the sub-frame 2 or the sub-frame 6 or the sub-frame 7, the retransmission indicator is set to be 1, otherwise, the retransmission indicator is set to be 0.

A Fourth Scenario

The operation that the adopted UL resource selection rule is determined on the basis of the UL resource indication information includes the following operations.

When the UL-DL sub-frame configuration 0 is adopted, if the MSB in the UL resource indication information is 1 and the LSB is 0, the UL resource selection rule is determined to be that, when the DL sub-frame is the sub-frame 0, the corresponding sub-frame delay is 4, when the DL sub-frame is the sub-frame 1, the corresponding sub-frame delay is 5 and 6, when the DL sub-frame is the sub-frame 5, the corresponding sub-frame delay is 4, and when the DL sub-frame is the sub-frame 6, the corresponding sub-frame delay is 5 and 6.

When the UL-DL sub-frame configuration 0 is adopted, if the MSB in the UL resource indication information is 0 and the LSB is 1, the UL resource selection rule is determined to be that, when the DL sub-frame is the sub-frame 0, the corresponding sub-frame delay is 6 and 7, when the DL sub-frame is the sub-frame 1, the corresponding sub-frame delay is 7, when the DL sub-frame is the sub-frame 5, the corresponding sub-frame delay is 6 and 7, and when the DL sub-frame is the sub-frame 6, the corresponding sub-frame delay is 7.

When the UL-DL sub-frame configuration 0 is adopted, if the MSB in the UL resource indication information is 1 and the LSB is 1, the UL resource selection rule is determined to be that, when the DL sub-frame is the sub-frame 0, the corresponding sub-frame delay is 4, 6 and 7, when the DL sub-frame is the sub-frame 1, the corresponding sub-frame delay is 5, 6 and 7, when the DL sub-frame is the sub-frame 5, the corresponding sub-frame delay is 4, 6 and 7, and when the DL sub-frame is the sub-frame 6, the corresponding sub-frame delay is 5, 6 and 7.

The method further includes the following operations.

When the UL-DL sub-frame configuration 0 is adopted and the retransmission indicator channel is received in the sub-frame 0 or the sub-frame 5, if the retransmission indicator is 0, it is determined that the sub-frame delay corresponding to the sub-frame 0 or the sub-frame 5 is 4, and if the retransmission indicator is 1, it is determined that the sub-frame delay corresponding to the sub-frame 0 or the sub-frame 5 is 7.

When the UL-DL sub-frame configuration 0 is adopted and the retransmission indicator channel is received in the sub-frame 1 or the sub-frame 6, if the retransmission indicator is 0, it is determined that the sub-frame delay corresponding to the sub-frame 1 or the sub-frame 6 is 6, and if the retransmission indicator is 1, it is determined that the sub-frame delay corresponding to the sub-frame 1 or the sub-frame 6 is 7.

The same UL grant is adopted to schedule the PUSCH of the UpPTS and the PUSCH of the UL sub-frame thereafter, that is, a UL grant of the sub-frame is bound together with a UL grant of the sub-frame 7 and a UL grant of the sub-frame 1 is bound together with a UL grant of the sub-frame 2.

For example, for the sub-frame 0, the sub-frame 4 may be scheduled and the sub-frames 6 and 7 may also be scheduled. For determining the sub-frame scheduled for it, the following specifications are defined.

A resource for DCI0 may be used in (n+k) and may also be used in (n+7). The field called UL_INDEX is introduced into the DCI0 in the protocol. The field UL_INDEX includes only two bits with the following specific meanings.

If MSB=1 and LSB=0, it is indicated that the two interaction parties are required to use the rule of (n+k). In such case, the sub-frame 4 is scheduled for the sub-frame 0, the sub-frames 6 and 7 are scheduled for the sub-frame 1, the sub-frame 9 is scheduled for the sub-frame 5 and the sub-frames 1 and 2 are scheduled for the sub-frame 6. That is, resources of at most two PUSCHs are simultaneously scheduled for a piece of DCI0.

If MSB=0 and LSB=1, it is indicated that the two interaction parties are required to use the rule of (n+7). In such case, the sub-frames 6 and 7 are scheduled for the sub-frame 0, the sub-frame 8 is scheduled for the sub-frame 1, the sub-frames 1 and 2 are scheduled for the sub-frame 5 and the sub-frame 3 is scheduled for the sub-frame 6. That is, resources of at most two PUSCHs are simultaneously scheduled for a piece of DCI0.

If MSB=1 and LSB=1, it is indicated that the two interaction parties are required to use the rules of (n+k) and (n+7). In such case, the sub-frames 4, 6 and 7 are scheduled for the sub-frame 0, the sub-frames 6, 7 and 8 are scheduled for the sub-frame 1, the sub-frames 9, 1 and 2 are scheduled for the sub-frame 5 and the sub-frames 1, 2 and 3 are scheduled for the sub-frame 6. That is, resources of three PUSCHs are simultaneously scheduled for a piece of DCI0.

A Fifth Scenario

The operation that the adopted UL resource selection rule is determined on the basis of the UL resource indication information includes the following operations.

When the UL-DL sub-frame configuration 0 is adopted, if the MSB in the UL resource indication information is 1 and the LSB is 0, the UL resource selection rule is determined to be that, when the DL sub-frame is the sub-frame 0 or the sub-frame 5, the corresponding sub-frame delay is 4, and when the DL sub-frame is the sub-frame 1 or the sub-frame 6, the corresponding sub-frame delay is 6.

When the UL-DL sub-frame configuration 0 is adopted, if the MSB in the UL resource indication information is 0 and the LSB is 1, the UL resource selection rule is determined to be that, when the DL sub-frame is the sub-frame 0, the sub-frame 1, the sub-frame 5 or the sub-frame 6, the corresponding sub-frame delay is 7.

When the UL-DL sub-frame configuration 0 is adopted, if the MSB in the UL resource indication information is 1 and the LSB is 1, the UL resource selection rule is determined to be that, when the DL sub-frame is the sub-frame 0 or the sub-frame 5, the corresponding sub-frame delay is 4 and 7, and when the DL sub-frame is the sub-frame 1 or the sub-frame 6, the corresponding sub-frame delay is 6 and 7.

When the UL-DL sub-frame configuration 0 is adopted, if the MSB in the UL resource indication information is 0 and the LSB is 0, the UL resource selection rule is determined to be that, when the DL sub-frame is the sub-frame 0 or the sub-frame 5, the corresponding sub-frame delay is 4, 6 and 7 or the corresponding sub-frame delay is 6 and 7 or the corresponding sub-frame delay is 6, and when the DL sub-frame is the sub-frame 1 or the sub-frame 6, the corresponding sub-frame delay is 5, 6 and 7, or the corresponding sub-frame delay is 6 and 5 or the corresponding sub-frame delay is 5.

The method further includes the following operations.

When the UL-DL sub-frame configuration 0 is adopted and the retransmission indicator channel is received in the sub-frame 0 or the sub-frame 5, if the retransmission indicator is 0, it is determined that the sub-frame delay corresponding to the sub-frame 0 or the sub-frame 5 is 4, and if the retransmission indicator is 1, it is determined that the sub-frame delay corresponding to the sub-frame 0 or the sub-frame 5 is 7.

When the UL-DL sub-frame configuration 0 is adopted and the retransmission indicator channel is received in the sub-frame 1 or the sub-frame 6, if the retransmission indicator is 0, it is determined that the sub-frame delay corresponding to the sub-frame 1 or the sub-frame 6 is 6, and if the retransmission indicator is 1, it is determined that the sub-frame delay corresponding to the sub-frame 1 or the sub-frame 6 is 7.

In the scenario, at most three PUSCHs are scheduled for a UL grant. For example, for the sub-frame 0, the sub-frame 4 may be scheduled and the sub-frames 6 and 7 may also be scheduled. For determining the sub-frame scheduled for it, the following specifications are defined.

The field called UL_INDEX is introduced into the DCI0 in the protocol. The field UL_INDEX includes only two bits with the following specific meanings.

If MSB=1 and LSB=0, it is indicated that the two interaction parties are required to use the rule of (n+k) and, in such case, a resource of a PUSCH is scheduled for a piece of DCI0.

If MSB=0 and LSB=1, it is indicated that the two interaction parties are required to use the rule of (n+7) and, in such case, a resource of a PUSCH is scheduled for a piece of DCI0.

If MSB=1 and LSB=1, it is indicated that the two interaction parties are required to use the rules of (n+k) and (n+7)

and, in such case, resources of two PUSCHs are simultaneously scheduled for a piece of DCI0.

If MSB=0 and LSB=0, for the sub-frame 0 and the sub-frame 5, it is indicated that the two interaction parties are required to use the rules of (n+k), (n+6) and (n+7) and, in such case, resources of three PUSCHs are simultaneously scheduled for a piece of DCI0;

it is indicated that the two interaction parties are required to use the rules of (n+6) and (n+7) and, in such case, resources of two PUSCHs are simultaneously scheduled for a piece of DCI0; and it is indicated that the two interaction parties are required to use the rule of (n+6) and, in such case, a resource of a PUSCH is scheduled for a piece of DCI0.

It is to be noted that the foregoing specific processing manners may be selected according to a practical condition or may be preset by a system.

For the sub-frame 1 and the sub-frame 6, a) it is indicated that the two interaction parties are required to use the rules of (n+k), (n+5) and (n+7) and, in such case, resources of three PUSCHs are simultaneously scheduled for a piece of DCI0;

b) it is indicated that the two interaction parties are required to use the rules of (n+k) and (n+5) and, in such case, resources of two PUSCHs are simultaneously scheduled for a piece of DCI0; and c) it is indicated that the two interaction parties are required to use the rule of (n+5) and, in such case, a resource of a PUSCH is scheduled for a piece of DCI0.

It is to be noted that the foregoing specific processing manners may be selected according to the practical condition or may be preset by the system.

A Sixth Scenario

The operation that the adopted UL resource selection rule is determined on the basis of the UL resource indication information includes the following operations.

When the UL-DL sub-frame configuration 0 is adopted, if the MSB in the UL resource indication information is 1 and the LSB is 0, the UL resource selection rule is determined to be that, when the DL sub-frame is the sub-frame 0 or the sub-frame 5, the corresponding sub-frame delay is 4, and when the DL sub-frame is the sub-frame 1 or the sub-frame 6, the corresponding sub-frame delay is 5.

When the UL-DL sub-frame configuration 0 is adopted, if the MSB in the UL resource indication information is 0 and the LSB is 1, the UL resource selection rule is determined to be that, when the DL sub-frame is the sub-frame 0, the sub-frame 1, the sub-frame 5 or the sub-frame 6, the corresponding sub-frame delay is 7.

When the UL-DL sub-frame configuration 0 is adopted, if the MSB in the UL resource indication information is 1 and the LSB is 1, the UL resource selection rule is determined to be that, when the DL sub-frame is the sub-frame 0 or the sub-frame 5, the corresponding sub-frame delay is 4 and 7, and when the DL sub-frame is the sub-frame 1 or the sub-frame 6, the corresponding sub-frame delay is 5 and 7.

Referring to Table 4, k values for the configuration 0 (case 3) are illustrated (applied to no changes of the existing HARQ time sequence table).

TABLE 4

| UL-DL sub-frame configuration | Serial number of the sub-frame | | | | | | | | | |
|---|---|---|---|---|---|---|---|---|---|---|
| | 0 | 1 | 2 | 3 | 4 | 5 | 6 | 7 | 8 | 9 |
| 0 | | 4 | 5 | | | | 4 | 5 | | |

At most two PUSCHs are scheduled for a UL grant.

For example, for the sub-frame 0, the sub-frame 4 may be scheduled and the sub-frame 7 may also be scheduled. For determining the sub-frame scheduled for it, the following specifications are defined.

A resource for DCI0 may be used in (n+k) and may also be used in (n+7). The field called UL_INDEX is introduced into the DCI0 in the protocol. The field UL_INDEX includes only two bits with the following specific meanings.

If MSB=1 and LSB=0, it is indicated that the two interaction parties are required to use the rule of (n+k) and, in such case, a resource of a PUSCH is scheduled for a piece of DCI0.

If MSB=0 and LSB=1, it is indicated that the two interaction parties are required to use the rule of (n+7) and, in such case, a resource of a PUSCH is scheduled for a piece of DCI0.

If MSB=1 and LSB=1, it is indicated that the two interaction parties are required to use the rules of (n+k) and (n+7) and, in such case, resources of two PUSCHs are simultaneously scheduled for a piece of DCI0.

The method further includes the following operations.

When the UL-DL sub-frame configuration 0 is adopted and the retransmission indicator channel is received in the sub-frame 0 or the sub-frame 5, if the retransmission indicator is 0, it is determined that the sub-frame delay corresponding to the sub-frame 0 or the sub-frame 5 is 4, and if the retransmission indicator is 1, it is determined that the sub-frame delay corresponding to the sub-frame 0 or the sub-frame 5 is 7.

When the UL-DL sub-frame configuration 0 is adopted and the retransmission indicator channel is received in the sub-frame 1 or the sub-frame 6, if the retransmission indicator is 0, it is determined that the sub-frame delay corresponding to the sub-frame 1 or the sub-frame 6 is 5, and if the retransmission indicator is 1, it is determined that the sub-frame delay corresponding to the sub-frame 1 or the sub-frame 6 is 7.

For the UL-DL configuration 0 for TDD, responsive to determining that the UL shared channel transmission is performed in the UL resource of the sub-frame 2 or the sub-frame 4 or the sub-frame 7 or the sub-frame 9, the retransmission indicator is set to be 1, otherwise, the retransmission indicator is set to be 0.

A Seventh Scenario

The operation that the adopted UL resource selection rule is determined on the basis of the UL resource indication information includes the following operations.

When a UL-DL sub-frame configuration 6 is adopted, if the MSB in the UL resource indication information is 1 and the LSB is 0, or, if the retransmission indicator channel is received in the sub-frame 5 and the retransmission indicator is 0, the UL resource selection rule is determined to be that, when the DL sub-frame is the sub-frame 5, the corresponding sub-frame delay is 13.

When the UL-DL sub-frame configuration 6 is adopted, if the MSB in the UL resource indication information is 0 and the LSB is 1, or, if the retransmission indicator channel is received in the sub-frame 5 and the retransmission indicator is 1, the UL resource selection rule is determined to be that, when the DL sub-frame is the sub-frame 5, the corresponding sub-frame delay is 16.

When the UL-DL sub-frame configuration 6 is adopted, if the MSB in the UL resource indication information is 1 and the LSB is 1, the UL resource selection rule is determined to be that, when the DL sub-frame is the sub-frame 5, the corresponding sub-frame delay is 16 and 13.

Referring to Table 5, k values for the configuration 6 are illustrated (applied to redesign of the HARQ time sequence table).

TABLE 5

| UL-DL sub-frame configuration | Serial number of the sub-frame | | | | | | | | | |
|---|---|---|---|---|---|---|---|---|---|---|
| | 0 | 1 | 2 | 3 | 4 | 5 | 6 | 7 | 8 | 9 |
| 6 | 16 | 16 | | | | 13 | 16 | | | 14 |

On the basis of Table 5, it can be seen that, when the UL-DL sub-frame configuration 6 is adopted, if the DL sub-frame is one of the sub-frame 0, the sub-frame 1 or the sub-frame 6, it is determined that the sub-frame delay corresponding to the UL sub-frame is 16.

Furthermore, for the Sub-Frame 5:

a resource for DCI0 may be used in (n+k) and may also be used in (n+16). The field called UL_INDEX is introduced into the DCI0 in the protocol. The field UL_INDEX includes only two bits with the following specific meanings.

If MSB=1 and LSB=0, or the PHICH is received in the sub-frame 5 and, correspondingly, $I_{PHICH}$=0, it is indicated that the two interaction parties are required to use the rule of (n+k) and, in such case, a resource of a PUSCH is scheduled for a piece of DCI0.

If MSB=0 and LSB=1, or the PHICH is received in the sub-frame 5 and, correspondingly, $I_{PHICH}$=1, it is indicated that the two interaction parties are required to use a rule of (n+16) and, in such case, a resource of a PUSCH is scheduled for a piece of DCI0.

If MSB=1 and LSB=1, it is indicated that the two interaction parties are required to use the rules of (n+k) and (n+16) and, in such case, resources of two PUSCHs are simultaneously scheduled for a piece of DCI0.

For the sub-frame 9, the operation that the adopted UL resource selection rule is determined on the basis of the UL resource indication information includes the following operations.

When the UL-DL sub-frame configuration 6 is adopted, if the MSB in the UL resource indication information is 1 and the LSB is 0, or, if the retransmission indicator channel is received in the sub-frame 9 and the retransmission indicator is 0, the UL resource selection rule is determined to be that, when the DL sub-frame is the sub-frame 9, the corresponding sub-frame delay is 14.

When the UL-DL sub-frame configuration 6 is adopted, if the MSB in the UL resource indication information is 0 and the LSB is 1, or, if the retransmission indicator channel is received in the sub-frame 9 and the retransmission indicator is 1, the UL resource selection rule is determined to be that, when the DL sub-frame is the sub-frame 9, the corresponding sub-frame delay is 16.

When the UL-DL sub-frame configuration 6 is adopted, if the MSB in the UL resource indication information is 1 and the LSB is 1, the UL resource selection rule is determined to be that, when the DL sub-frame is the sub-frame 9, the corresponding sub-frame delay is 16 and 14.

Specifically, a resource for DCI0 may be used in (n+k) and may also be used in (n+15). The field called UL_INDEX is introduced into the DCI0 in the protocol. The field UL_INDEX includes only two bits with the following specific meanings.

If MSB=1 and LSB=0, or the PHICH is received in the sub-frame 9 and, correspondingly, $I_{PHICH}$=0, it is indicated that the two interaction parties are required to use the rule of (n+k) and, in such case, a resource of a PUSCH is scheduled for a piece of DCI0.

If MSB=0 and LSB=1, or the PHICH is received in the sub-frame 9 and, correspondingly, $I_{PHICH}$=1, it is indicated that the two interaction parties are required to use a rule of (n+16) and, in such case, a resource of a PUSCH is scheduled for a piece of DCI0.

If MSB=1 and LSB=1, it is indicated that the two interaction parties are required to use the rules of (n+k) and (n+16) and, in such case, resources of two PUSCHs are simultaneously scheduled for a piece of DCI0.

For the UL-DL configuration 6 for TDD, responsive to determining that the UL shared channel transmission is performed in the UL resource of the sub-frame 4 or the sub-frame 1, the retransmission indicator is set to be 1, otherwise, the retransmission indicator is set to be 0.

An Eighth Scenario

The operation that the at least one corresponding sub-frame delay is determined on the basis of the serial number of the DL sub-frame containing the UL grant information includes the following operations.

When the UL-DL sub-frame configuration 6 is adopted, if the DL sub-frame is the sub-frame 0 or the sub-frame 5, it is determined that the corresponding sub-frame delay is 6 and 7, if the DL sub-frame is the sub-frame 1 or the sub-frame 6, it is determined that the corresponding sub-frame delay is 7, and if the DL sub-frame is the sub-frame 9, it is determined that the corresponding sub-frame delay is 5.

The following solution 6 may be adopted for the second solution of only adding a HARQ design for data transmitted in the UpPTS without changing the existing HARQ time sequence.

Referring to Table 6, configuration 6 (case 1 & case 2) wherein the existing HARQ time sequence table is kept unchanged is illustrated.

TABLE 6

| UL-DL sub-frame configuration | Serial number of the sub-frame | | | | | | | | | |
|---|---|---|---|---|---|---|---|---|---|---|
| | 0 | 1 | 2 | 3 | 4 | 5 | 6 | 7 | 8 | 9 |
| 6 | 7 | 7 | | | | 7 | 7 | | | 5 |

The same UL grant is adopted to schedule the PUSCH of the UpPTS and the PUSCH of the UL sub-frame thereafter, that is, the UL grant of the sub-frame is bound together with the UL grant of the sub-frame 7 and the UL grant of the sub-frame 1 is bound together with the UL grant of the sub-frame 2.

In such case, the sub-frame 4 is scheduled for the sub-frame 9, the sub-frames 6 and 7 are scheduled for the sub-frame 0, the sub-frame 8 is scheduled for the sub-frame 1, the sub-frames 1 and 2 are scheduled for the sub-frame 5 and the sub-frame 3 is scheduled for the sub-frame 6. That is, resources of at most two PUSCHs are simultaneously scheduled for a piece of DCI0.

In addition, there also exists another condition that at most two PUSCHs are scheduled for a UL grant.

The operation that the adopted UL resource selection rule is determined on the basis of the UL resource indication information includes the following operations.

When the UL-DL sub-frame configuration 6 is adopted, if the MSB in the UL resource indication information is 1 and the LSB is 0, or, if the retransmission indicator channel is received in the sub-frame 0 or the sub-frame 5 and the retransmission indicator is 0, the UL resource selection rule is determined to be that, when the DL sub-frame is the sub-frame 0 or the sub-frame 5, the corresponding sub-frame delay is 7.

When the UL-DL sub-frame configuration 6 is adopted, if the MSB in the UL resource indication information is 0 and the LSB is 1, or, if the retransmission indicator channel is received in the sub-frame 0 or the sub-frame 5 and the retransmission indicator is 1, the UL resource selection rule is determined to be that, when the DL sub-frame is the sub-frame 0 or the sub-frame 5, the corresponding sub-frame delay is 6.

When the UL-DL sub-frame configuration 6 is adopted, if the MSB in the UL resource indication information is 1 and the LSB is 1, the UL resource selection rule is determined to be that, when the DL sub-frame is the sub-frame 0 or the sub-frame 5, the corresponding sub-frame delay is 7 and 6.

The method further includes the following operations.

Responsive to determining that the UL shared channel transmission is performed in the UL resource of the sub-frame 1 or the sub-frame 6, the retransmission indicator is set to be 1, otherwise, the retransmission indicator is set to be 0.

For example, for the sub-frame 0, the sub-frame 6 may be scheduled and the sub-frame 7 may also be scheduled. For determining the sub-frame scheduled for it, the following specifications are defined.

A resource for DCI0 may be used in (n+k) and may also be used in (n+6). The field called UL_INDEX is introduced into the DCI0 in the protocol. The field UL_INDEX includes only two bits with the following specific meanings.

If MSB=1 and LSB=0, or the PHICH is received in the sub-frame 0 or 5 and, correspondingly, $I_{PHICH}=0$ it is indicated that the two interaction parties are required to use the rule of (n+k) and, in such case, a resource of a PUSCH is scheduled for a piece of DCI0.

If MSB=0 and LSB=1, or the PHICH is received in the sub-frame 0 or 5 and, correspondingly, $I_{PHICH}=1$, it is indicated that the two interaction parties are required to use the rule of (n+6) and, in such case, a resource of a PUSCH is scheduled for a piece of DCI0.

If MSB=1 and LSB=1, it is indicated that the two interaction parties are required to use the rules of (n+k) and (n+6) and, in such case, resources of at most two PUSCHs are simultaneously scheduled for a piece of DCI0.

For the UL-DL configuration 6 for TDD, when the PUSCH transmission is performed in the sub-frame n=6 or the sub-frame n=1, $I_{PHICH}=1$ and, when the PUSCH transmission is performed in another sub-frame, $I_{PHICH}=0$.

On the basis of the scenarios provided above, the embodiment also provides a sub-frame position where the UE, after sending UL information, namely sending the PUSCH, receives the retransmission indicator channel sent by the eNB side. Herein, the retransmission indicator channel is a PHICH. A PUSCH transmission and PHICH transmission time sequence is that a sub-frame position of a PHICH corresponding to a PUSCH of an nth sub-frame is $n+k_{PHICH}$. The following three processing manners are adopted for a value of $k_{PHICH}$ A first processing manner: $k_{PHICH}$ values in the configurations 1-5 are specifically as follows.

After the operation that the UL shared channel transmission is performed in the at least one UL resource, the method further includes the following operations.

When the UL-DL sub-frame configuration 1 is adopted, if the UL shared channel transmission is performed in one of the sub-frame 1, the sub-frame 2, the sub-frame 6 or the sub-frame 7, it is determined that the corresponding sub-frame delay for reception of the retransmission indicator channel is 4, and if the UL shared channel transmission is performed in the sub-frame 3 or the sub-frame 8, it is determined that the corresponding sub-frame delay is 6.

When the UL-DL sub-frame configuration 2 is adopted, if the UL shared channel transmission is performed in the sub-frame 1 or the sub-frame 6, it is determined that the corresponding sub-frame delay for reception of the retransmission indicator channel is 5, and if the UL shared channel transmission is performed in the sub-frame 2 or the sub-frame 7, it is determined that the corresponding sub-frame delay is 6.

When the UL-DL sub-frame configuration 3 is adopted, if the UL shared channel transmission is performed in one of the sub-frame 1, the sub-frame 2, the sub-frame 3 or the sub-frame 4, it is determined that the corresponding sub-frame delay for reception of the retransmission indicator channel is 6.

When the UL-DL sub-frame configuration 4 is adopted, if the UL shared channel transmission is performed in one of the sub-frame 1, the sub-frame 2 or the sub-frame 3, it is determined that the corresponding sub-frame delay for reception of the retransmission indicator channel is 6.

When the UL-DL sub-frame configuration 5 is adopted, if the UL shared channel transmission is performed in the sub-frame 1 or the sub-frame 2, it is determined that the corresponding sub-frame delay for reception of the retransmission indicator channel is 6.

Referring to Table 7:

TABLE 7

| UL-DL sub-frame configuration | Serial number of the sub-frame | | | | | | | | | |
|---|---|---|---|---|---|---|---|---|---|---|
| | 0 | 1 | 2 | 3 | 4 | 5 | 6 | 7 | 8 | 9 |
| 1 | | 4 | 4 | 6 | | | | 4 | 4 | 6 |
| 2 | | 5 | 6 | | | | | 5 | 6 | |
| 3 | | 6 | 6 | 6 | 6 | | | | | |
| 4 | | 6 | 6 | 6 | | | | | | |
| 5 | | 6 | 6 | | | | | | | |

A Second Processing Manner

After the operation that the UL shared channel transmission is performed in the at least one UL resource, the method further includes the following operations.

When the UL-DL sub-frame configuration 0 is adopted, if the UL shared channel transmission is performed in one of the sub-frame 1, the sub-frame 2, the sub-frame 6 or the sub-frame 7, it is determined that the corresponding sub-frame delay for reception of the retransmission indicator channel is 4, if the UL shared channel transmission is performed in the sub-frame 3 or the sub-frame 8, it is determined that the corresponding sub-frame delay for reception of the retransmission indicator channel is 7, and if the UL shared channel transmission is performed in the sub-frame 4 or the sub-frame 9, it is determined that the corresponding sub-frame delay for reception of the retransmission indicator channel is 6.

When the UL-DL sub-frame configuration 6 is adopted, if the UL shared channel transmission is performed in one of the sub-frame 1, the sub-frame 2, the sub-frame 6 or the sub-frame 7, it is determined that the corresponding sub-frame delay for reception of the retransmission indicator channel is 4, if the UL shared channel transmission is performed in the sub-frame 3, it is determined that the corresponding sub-frame delay for reception of the retransmission indicator channel is 6, if the UL shared channel transmission is performed in the sub-frame 4, it is determined that the corresponding sub-frame delay for reception of the retransmission indicator channel is 5, and if the UL shared channel transmission is performed in the sub-frame 8, it is determined that the corresponding sub-frame delay for reception of the retransmission indicator channel is 7.

A Third Processing Manner

After the operation that the UL shared channel transmission is performed in the at least one UL resource, the method further includes the following operations.

When the UL-DL sub-frame configuration 0 is adopted, if the UL shared channel transmission is performed in one of the sub-frame 1 or the sub-frame 6, it is determined that the corresponding sub-frame delay for reception of the retransmission indicator channel is 5, if the UL shared channel transmission is performed in one of the sub-frame 2 or the sub-frame 7, it is determined that the corresponding sub-frame delay for reception of the retransmission indicator channel is 4, if the UL shared channel transmission is performed in the sub-frame 3 or the sub-frame 8, it is determined that the corresponding sub-frame delay for reception of the retransmission indicator channel is 7, and if the UL shared channel transmission is performed in the sub-frame 4 or 9, it is determined that the corresponding sub-frame delay for reception of the retransmission indicator channel is 6.

When the UL-DL sub-frame configuration 6 is adopted, if the UL shared channel transmission is performed in one of the sub-frame 1, the sub-frame 2, the sub-frame 6 or the sub-frame 7, it is determined that the corresponding sub-frame delay for reception of the retransmission indicator channel is 4, if the UL shared channel transmission is performed in the sub-frame 3 or the sub-frame 4, it is determined that the corresponding sub-frame delay for reception of the retransmission indicator channel is 6, and if the UL shared channel transmission is performed in the sub-frame 8, it is determined that the corresponding sub-frame delay for reception of the retransmission indicator channel is 7.

Referring to Table 8, $k_{PHICH}$ values for the configurations 0 and 6 are illustrated (applied to redesign of the HARQ time sequence table).

TABLE 8

| UL-DL sub-frame configuration | Serial number of the sub-frame | | | | | | | | | |
|---|---|---|---|---|---|---|---|---|---|---|
| | 0 | 1 | 2 | 3 | 4 | 5 | 6 | 7 | 8 | 9 |
| 0 | | 4 | 4 | 7 | 6 | | 4 | 4 | 7 | 6 |
| 6 | | 4 | 4 | 6 | 5 | | 4 | 4 | 7 | |

$k_{PHICH}$ values in the configurations 0 and 6 refer to Table 9 (corresponding to no changes of the existing HARQ time sequence table).

TABLE 9

| UL-DL sub-frame configuration | Serial number of the sub-frame | | | | | | | | | |
|---|---|---|---|---|---|---|---|---|---|---|
| | 0 | 1 | 2 | 3 | 4 | 5 | 6 | 7 | 8 | 9 |
| 0 | | 5 | 4 | 7 | 6 | | 5 | 4 | 7 | 6 |
| 6 | | 4 | 4 | 6 | 6 | | 4 | 4 | 7 | |

Figure 3:
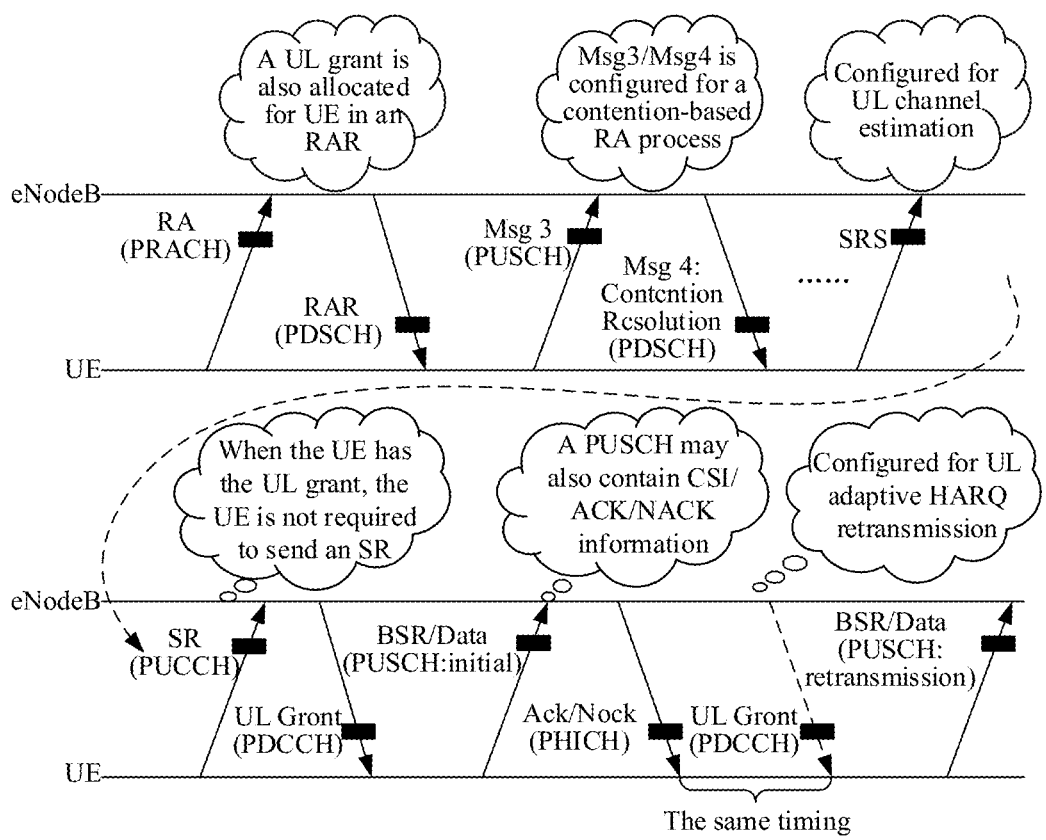
FIG. 3 is a UL flowchart according to an embodiment of the disclosure.

A UL flow for interaction between the UE and the eNB side will further be introduced below in combination with FIG. 3 and includes the following operations.

In (1), the UE sends a Message 1 (MSG1) to the eNB through an RA process. The eNB, after receiving RA, configures a UL grant to be used for a MSG3 in a Random Access Response (RAR). The UE subsequently sends the MSG3 in a resource specified by the UL grant.

In (2), the eNB measures an SRS sent from the UE to obtain an UL channel estimate.

In (3), for UL transmission, the UE, only when the eNB allocates a UL PUSCH resource for the UE through the UL grant (PDCCH), may use the corresponding resource for UL transmission. When no UL PUSCH resource is allocated for the UE but there is UL data to be sent, the UE may send an SR to notify the eNB that there is data to be sent and request the eNB to allocate the UL PUSCH resource.

In (4), the UE is required to notify the eNB of the amount of the data to be sent and then the eNB may determine the number of resources to be allocated for the UE. Through the SR, the UE only notifies the eNB that there is data to be sent and does not notify the amount of the data to be sent to the eNB. Therefore, the UE is required to notify the amount of the data to be sent to the eNB through a BSR.

In (5), after the UE establishes a connection with the eNB, the UE may be required to perform data transmission with the eNB. The UE may bear the data sent to the eNB through a PUSCH. The eNB is required to notify the UE whether the eNB successfully receives the data or not by use of an ACK/NACK. In such case, the ACK/NACK is sent to the UE through a PHICH. If the eNB fails to receive the UL data, the UE is required to retransmit the data.

In (6), a wireless channel condition may keep changing, and the UE is required to feed back a DL wireless channel condition detected by it to the eNB through Channel State Information (CSI) to enable the eNB to consider channel quality during DL scheduling. The CSI is transmitted through a Physical Uplink Control Channel (PUCCH) or the PUSCH.

It can be seen that, in the embodiment, a PUSCH and scheduling sub-frame time sequence relationship is designed on the basis of the proportion 6:2:6 of DwPTS:GP:UpPTS in the newly added special sub-frame proportioning mode 10 and support of PUSCH transmission by an UpPTS design, including:

(1) the solution tables provided for the configurations 0 to 6 under the condition of redesigning the HARQ time sequence table and the solutions when DL scheduling sub-frames are fewer than UL PUSCH transmission sub-frames, as described above; and (2) the time sequence tables provided for the configurations 0 to 6 under the condition that only one process is added without changing the existing HARQ time sequence table.

For UL grant scheduling solutions, there are four configurations 0.

a) case 0: different UL grants are used to schedule the PUSCH of the UpPTS and a PUSCH of a UL sub-frame thereafter, and at most two PUSCHs are scheduled by one UL grant.

b) case 1: a same UL grant is used to schedule the PUSCH of the UpPTS and the PUSCH of the UL sub-frame thereafter, that is, the UL grant of the sub-frame is bound together with the UL grant of the sub-frame 7 and the UL grant of the sub-frame 1 is bound together with the UL grant of the sub-frame 2.

c) case 2: at most three PUSCHs are scheduled by one UL grant.

d) case 3: at most two PUSCHs are scheduled by one UL grant.

There are two configurations 6.

a) case 1: a same UL grant is used to schedule the PUSCH of the UpPTS and the PUSCH of the UL sub-frame thereafter, that is, the UL grant of the sub-frame is bound together with the UL grant of the sub-frame 7 and the UL grant of the sub-frame 1 is bound together with the UL grant of the sub-frame 2.

b) case 2: at most two PUSCHs are scheduled by one UL grant.

A PUSCH and feedback sub-frame time sequence relationship is designed on the basis of the proportion 6:2:6 of DwPTS:GP:UpPTS in the newly added special sub-frame proportioning mode 10 and support of PUSCH transmission by the UpPTS design, for example, the time sequence tables for the configurations 0 to 6 in the time sequence 2.

It can be seen that, with adoption of the solutions, the UE, after receiving the DL sub-frame corresponding to the UL grant information sent from the eNB, may determine the corresponding UL resource on the basis of the DL sub-frame and the UL resource may particularly include the UpPTS of the special sub-frame, so that more UL resources may be adopted to transmit UL signals. In addition, since the UL resources configured to transmit the UL signals are added, the amount of information born in each UL resource may also be reduced and an effect of ensuring a UL information transmission spectrum is achieved.

Second Embodiment

Figure 4:
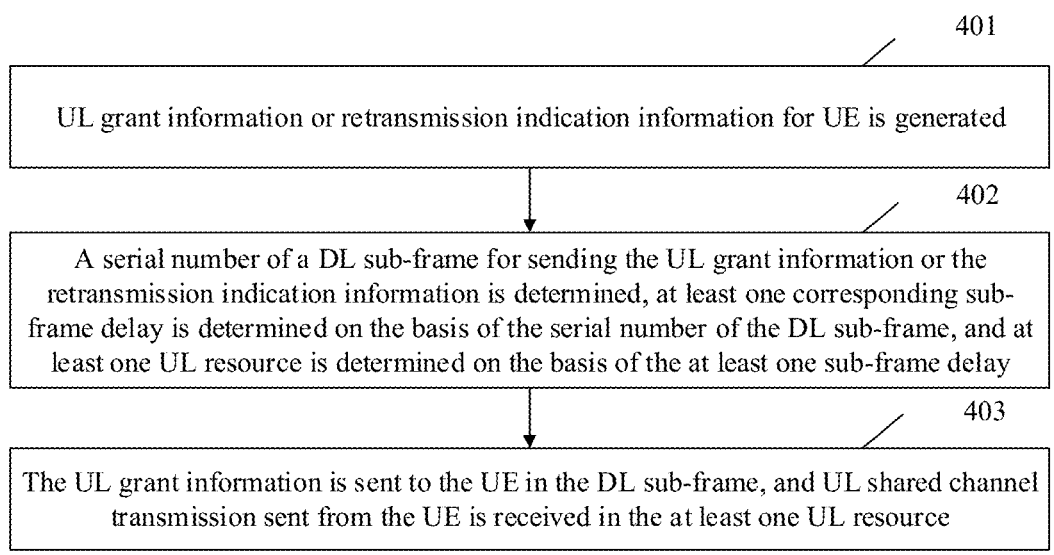
FIG. 4 is a second flowchart of a message transmission method according to an embodiment of the disclosure.

Corresponding to processing provided in the first embodiment on a UE side, an eNB side is also required to execute corresponding processing to ensure that the eNB side correctly receives information uploaded by UE. Specifically referring to FIG. 4, the following steps are included.

In 401, UL grant information or retransmission indication information for UE is generated.

In 402, a serial number of a DL sub-frame for sending the UL grant information or retransmission indication information is determined, at least one corresponding sub-frame delay is determined on the basis of the serial number of the DL sub-frame and at least one UL resource is determined on the basis of the at least one sub-frame delay, the UL resource being at least one of a UL sub-frame or an UpPTS in a special sub-frame.

In 403, the UL grant information is sent to the UE in the DL sub-frame, and UL shared channel transmission sent from the UE is received in the at least one UL resource.

Herein, the operation that the UL grant information is sent to the UE in the DL sub-frame includes the following operations.

UL resource indication information and the UL grant information are added into DCI, and the DCI is sent to the UE in the DL sub-frame, the UL resource indication information being configured to indicate a UL resource selection rule adopted by the UE. Herein, the DCI may be DCI0.

In the embodiment, different UL-DL configurations are required to be considered for a TDD system. Seven different TDD UL/DL proportions are supported by LTE. As shown in FIG. 2, seven UL-DL sub-frame configurations shown in the figure are called a UL-DL sub-frame configuration 0 to a UL-DL sub-frame configuration 6. In the figure, D identifies a DL sub-frame, S identifies a special sub-frame and U identifies a UL sub-frame.

Descriptions about message transmission performed on the basis of the seven UL-DL sub-frame configurations respectively will be made below. Particularly, the descriptions will focus on how to determine and indicate the specific sub-frame for transmission of a UL channel by the UE. Herein, the UL channel may be a PUSCH. In addition, the UL grant information may be a UL grant and may be contained in the DCI for transmission. The UE, when receiving the UL-grant, determines a time sequence for transmission of the PUSCH to be sent to the eNB. The following specific scenarios are included.

A First Scenario

The method further includes the following operations.

When a UL-DL sub-frame configuration 0 is adopted, an MSB in the UL resource indication information is set to be 1 and an LSB is set to be 0, or, if a retransmission indicator channel is received in a sub-frame 0 or a sub-frame 5 and a retransmission indicator is 0, so as to indicate the corresponding UL resource selection rule to be that, when the DL sub-frame is the sub-frame 0 or the sub-frame 5, the corresponding sub-frame delay is 8.

When the UL-DL sub-frame configuration 0 is adopted, the MSB in the UL resource indication information is set to be 0 and the LSB is set to be 1, or, if the retransmission indicator channel is received in the sub-frame 0 or the sub-frame 5 and the retransmission indicator is 1, so as to indicate the corresponding UL resource selection rule to be that, when the DL sub-frame is the sub-frame 0 or the sub-frame 5, the corresponding sub-frame delay is 9.

When the UL-DL sub-frame configuration 0 is adopted, the MSB in the UL resource indication information is set to be 1 and the LSB is set to be 1, so as to indicate the corresponding UL resource selection rule to be that, when the DL sub-frame is the sub-frame 0 or the sub-frame 5, the corresponding sub-frame delay is 8 and 9.

When the UL-DL sub-frame configuration 0 is adopted, the MSB in the UL resource indication information is set to be 1 and the LSB is set to be 0, or, if the retransmission indicator channel is received in a sub-frame 1 or a sub-frame 6 and the retransmission indicator is 0, so as to indicate the corresponding UL resource selection rule to be that, when the DL sub-frame is the sub-frame 1 or the sub-frame 6, the corresponding sub-frame delay is 10.

When the UL-DL sub-frame configuration 0 is adopted, the MSB in the UL resource indication information is set to be 0 and the LSB is set to be 1, or, if the retransmission indicator channel is received in the sub-frame 1 or the sub-frame 6 and the retransmission indicator is 1, so as to indicate the corresponding UL resource selection rule to be that, when the DL sub-frame is the sub-frame 1 or the sub-frame 6, the corresponding sub-frame delay is 11.

When the UL-DL sub-frame configuration 0 is adopted, the MSB in the UL resource indication information is set to be 1 and the LSB is set to be 1, so as to indicate the corresponding UL resource selection rule to be that, when the DL sub-frame is the sub-frame 1 or the sub-frame 6, the corresponding sub-frame delay is 10 and 11.

For example, for the sub-frame 0, a sub-frame 8 may be scheduled and a sub-frame 9 may also be scheduled. For determining the sub-frame scheduled for it, the following specifications are defined.

For the Sub-Frames 0 and 5

A resource for DCI0 may be used in (n+k) and may also be used in (n+9). A field called UL_INDEX is introduced into the DCI0 in a protocol. The field UL_INDEX includes only two bits with the following specific meanings.

If MSB=1 and LSB=0, or the PHICH is received in the sub-frame 0 or 5 and, correspondingly, $I_{PHICH}=0$, it is indicated that two interaction parties are required to use a rule of (n+k) and, in such case, a resource of a PUSCH is scheduled for a piece of DCI0.

If MSB=0 and LSB=1, or the PHICH is received in the sub-frame 0 or 5 and, correspondingly, $I_{PHICH}=1$, it is indicated that the two interaction parties are required to use a rule of (n+9) and, in such case, a resource of a PUSCH is scheduled for a piece of DCI0.

If MSB=1 and LSB=1, it is indicated that the two interaction parties are required to use the rules of (n+k) and (n+9) and, in such case, resources of two PUSCHs are simultaneously scheduled for a piece of DCI0.

For the Sub-Frames 1 and 6

A resource for DCI0 may be used in (n+k) and may also be used in (n+1). The field called UL_INDEX is introduced into the DCI0 in the protocol. The field UL_INDEX includes only two bits with the following specific meanings.

If MSB=1 and LSB=0, or the PHICH is received in the sub-frame 1 or 6 and, correspondingly, $I_{PHICH}=0$, it is indicated that the two interaction parties are required to use the rule of (n+k) and, in such case, a resource of a PUSCH is scheduled for a piece of DCI0.

If MSB=0 and LSB=1, or the PHICH is received in the sub-frame 1 or 6 and, correspondingly, $I_{PHICH}=1$, it is indicated that the two interaction parties are required to use a rule of (n+1) and, in such case, a resource of a PUSCH is scheduled for a piece of DCI0.

If MSB=1 and LSB=1, it is indicated that the two interaction parties are required to use the rules of (n+k) and (n+9) and, in such case, resources of two PUSCHs are simultaneously scheduled for a piece of DCI0.

A Second Scenario

When the UL-DL sub-frame configuration 0 is adopted, the MSB in the UL resource indication information is set to be 1 and the LSB is set to be 0, or, if the retransmission indicator channel is received in the sub-frame 0 or the sub-frame 5 and the retransmission indicator is 0, so as to indicate the corresponding UL resource selection rule to be that, when the DL sub-frame is the sub-frame 0 or the sub-frame 5, the corresponding sub-frame delay is 4.

When the UL-DL sub-frame configuration 0 is adopted, the MSB in the UL resource indication information is set to be 0 and the LSB is set to be 1, or, if the retransmission indicator channel is received in the sub-frame 0 or the sub-frame 5 and the retransmission indicator is 1, so as to indicate the corresponding UL resource selection rule to be that, when the DL sub-frame is the sub-frame 0 or the sub-frame 5, the corresponding sub-frame delay is 6.

When the UL-DL sub-frame configuration 0 is adopted, the MSB in the UL resource indication information is set to be 1 and the LSB is set to be 1, so as to indicate the corresponding UL resource selection rule to be that, when the DL sub-frame is the sub-frame 0 or the sub-frame 5, the corresponding sub-frame delay is 4 and 6.

When the UL-DL sub-frame configuration 0 is adopted, the MSB in the UL resource indication information is set to be 1 and the LSB is set to be 0, or, if the retransmission indicator channel is received in the sub-frame 1 or the sub-frame 6 and the retransmission indicator is 0, so as to indicate the corresponding UL resource selection rule to be that, when the DL sub-frame is the sub-frame 1 or the sub-frame 6, the corresponding sub-frame delay is 6.

When the UL-DL sub-frame configuration 0 is adopted, the MSB in the UL resource indication information is set to be 0 and the LSB is set to be 1, or, if the retransmission indicator channel is received in the sub-frame 1 or the sub-frame 6 and the retransmission indicator is 1, so as to indicate the corresponding UL resource selection rule to be that, when the DL sub-frame is the sub-frame 1 or the sub-frame 6, the corresponding sub-frame delay is 7.

When the UL-DL sub-frame configuration 0 is adopted, the MSB in the UL resource indication information is set to be 1 and the LSB is set to be 1, so as to indicate the corresponding UL resource selection rule to be that, when the DL sub-frame is the sub-frame 1 or the sub-frame 6, the corresponding sub-frame delay is 6 and 7.

Specifically, different UL grants are adopted to schedule the PUSCH of the UpPTS and a PUSCH of a UL sub-frame thereafter and at most two PUSCHs are scheduled by a UL grant.

For example, for the sub-frame 0, a sub-frame 4 may be scheduled and the sub-frame 6 may also be scheduled. For determining the sub-frame scheduled for it, the following specifications are defined.

(1) For the Sub-Frames 0 and 5

A resource for DCI0 may be used in (n+k) and may also be used in (n+6). The field called UL_INDEX is introduced into the DCI0 in the protocol. The field UL_INDEX includes only two bits with the following specific meanings.

If MSB=1 and LSB=0, or the PHICH is received in the sub-frame 0 or 5 and, correspondingly, $I_{PHICH}=0$, it is indicated that the two interaction parties are required to use the rule of (n+k) and, in such case, a resource of a PUSCH is scheduled for a piece of DCI0.

If MSB=0 and LSB=1, or the PHICH is received in the sub-frame 0 or 5 and, correspondingly, $I_{PHICH}=1$, it is indicated that the two interaction parties are required to use a rule of (n+6) and, in such case, a resource of a PUSCH is scheduled for a piece of DCI0.

If MSB=1 and LSB=1, it is indicated that the two interaction parties are required to use the rules of (n+k) and (n+6) and, in such case, resources of two PUSCHs are simultaneously scheduled for a piece of DCI0.

For the sub-frames 1 and 6: a resource for DCI0 may be used in (n+k) and may also be used in (n+7). The field called UL_INDEX is introduced into the DCI0 in the protocol. The field UL_INDEX includes only two bits with the following specific meanings.

If MSB=1 and LSB=0, or the PHICH is received in the sub-frame 1 or 6 and, correspondingly, $I_{PHICH}=0$, it is indicated that the two interaction parties are required to use the rule of (n+k) and, in such case, a resource of a PUSCH is scheduled for a piece of DCI0.

If MSB=0 and LSB=1, or the PHICH is received in the sub-frame 1 or 6 and, correspondingly, $I_{PHICH}=1$, it is indicated that the two interaction parties are required to use a rule of (n+7) and, in such case, a resource of a PUSCH is scheduled for a piece of DCI0.

If MSB=1 and LSB=1, it is indicated that the two interaction parties are required to use the rules of (n+k) and (n+7) and, in such case, resources of two PUSCHs are simultaneously scheduled for a piece of DCI0.

A Third Scenario

When the UL-DL sub-frame configuration 0 is adopted, the MSB in the UL resource indication information is set to be 1 and the LSB is set to be 0, so as to indicate the corresponding UL resource selection rule to be that, when the DL sub-frame is the sub-frame 0, the corresponding sub-frame delay is 4, when the DL sub-frame is the sub-frame 1, the corresponding sub-frame delay is 5 and 6, when the DL sub-frame is the sub-frame 5, the corresponding sub-frame delay is 4, and when the DL sub-frame is the sub-frame 6, the corresponding sub-frame delay is 5 and 6.

When the UL-DL sub-frame configuration 0 is adopted, the MSB in the UL resource indication information is set to be 0 and the LSB is set to be 1, so as to indicate the corresponding UL resource selection rule to be that, when the DL sub-frame is the sub-frame 0, the corresponding sub-frame delay is 6 and 7, when the DL sub-frame is the sub-frame 1, the corresponding sub-frame delay is 7, when the DL sub-frame is the sub-frame 5, the corresponding sub-frame delay is 6 and 7, and when the DL sub-frame is the sub-frame 6, the corresponding sub-frame delay is 7.

When the UL-DL sub-frame configuration 0 is adopted, the MSB in the UL resource indication information is set to be 1 and the LSB is set to be 1, so as to indicate the corresponding UL resource selection rule to be that, when the DL sub-frame is the sub-frame 0, the corresponding sub-frame delay is 4, 6 and 7, when the DL sub-frame is the sub-frame 1, the corresponding sub-frame delay is 5, 6 and 7, when the DL sub-frame is the sub-frame 5, the corresponding sub-frame delay is 4, 6 and 7, and when the DL sub-frame is the sub-frame 6, the corresponding sub-frame delay is 5, 6 and 7.

The method further includes the following operations.

When the UL-DL sub-frame configuration 0 is adopted and the retransmission indicator channel is received in the sub-frame 0 or the sub-frame 5, if the retransmission indicator is 0, it is determined that the sub-frame delay corresponding to the sub-frame 0 or the sub-frame 5 is 4, and if the retransmission indicator is 1, it is determined that the sub-frame delay corresponding to the sub-frame 0 or the sub-frame 5 is 7.

When the UL-DL sub-frame configuration 0 is adopted and the retransmission indicator channel is received in the sub-frame 1 or the sub-frame 6, if the retransmission indicator is 0, it is determined that the sub-frame delay corresponding to the sub-frame 1 or the sub-frame 6 is 6, and if the retransmission indicator is 1, it is determined that the sub-frame delay corresponding to the sub-frame 1 or the sub-frame 6 is 7.

A resource for DCI0 may be used in (n+k) and may also be used in (n+7). The field called UL_INDEX is introduced into the DCI0 in the protocol. The field UL_INDEX includes only two bits with the following specific meanings.

If MSB=1 and LSB=0, it is indicated that the two interaction parties are required to use the rule of (n+k). In such case, the sub-frame 4 is scheduled for the sub-frame 0, the sub-frames 6 and 7 are scheduled for the sub-frame 1, a sub-frame 9 is scheduled for the sub-frame 5 and the sub-frames 1 and 2 are scheduled for the sub-frame 6. That is, resources of at most two PUSCHs are simultaneously scheduled for a piece of DCI0.

If MSB=0 and LSB=1, it is indicated that the two interaction parties are required to use a rule of (n+7). In such case, the sub-frames 6 and 7 are scheduled for the sub-frame 0, a sub-frame 8 is scheduled for the sub-frame 1, the sub-frames 1 and 2 are scheduled for the sub-frame 5 and a sub-frame 3 is scheduled for the sub-frame 6. That is, resources of at most two PUSCHs are simultaneously scheduled for a piece of DCI0.

If MSB=1 and LSB=1, it is indicated that the two interaction parties are required to use the rules of (n+k) and (n+7). In such case, the sub-frames 4, 6 and 7 are scheduled for the sub-frame 0, the sub-frames 6, 7 and 8 are scheduled for the sub-frame 1, the sub-frames 9, 1 and 2 are scheduled for the sub-frame 5 and the sub-frames 1, 2 and 3 are scheduled for the sub-frame 6. That is, resources of three PUSCHs are simultaneously scheduled for a piece of DCI0.

A Fourth Scenario

When the UL-DL sub-frame configuration 0 is adopted, if the MSB in the UL resource indication information is 1 and the LSB is 0, the UL resource selection rule is determined to be that, when the DL sub-frame is the sub-frame 0 or the sub-frame 5, the corresponding sub-frame delay is 4, and when the DL sub-frame is the sub-frame 1 or the sub-frame 6, the corresponding sub-frame delay is 6.

When the UL-DL sub-frame configuration 0 is adopted, if the MSB in the UL resource indication information is 0 and the LSB is 1, the UL resource selection rule is determined to be that, when the DL sub-frame is the sub-frame 0, the sub-frame 1, the sub-frame 5 or the sub-frame 6, the corresponding sub-frame delay is 7.

When the UL-DL sub-frame configuration 0 is adopted, if the MSB in the UL resource indication information is 1 and the LSB is 1, the UL resource selection rule is determined to be that, when the DL sub-frame is the sub-frame 0 or the sub-frame 5, the corresponding sub-frame delay is 4 and 7, and when the DL sub-frame is the sub-frame 1 or the sub-frame 6, the corresponding sub-frame delay is 6 and 7.

When the UL-DL sub-frame configuration 0 is adopted, if the MSB in the UL resource indication information is 0 and the LSB is 0, the UL resource selection rule is determined to be that, when the DL sub-frame is the sub-frame 0 or the sub-frame 5, the corresponding sub-frame delay is 4, 6 and 7 or the corresponding sub-frame delay is 6 and 7 or the corresponding sub-frame delay is 6, and when the DL sub-frame is the sub-frame 1 or the sub-frame 6, the corresponding sub-frame delay is 5, 6 and 7, or the corresponding sub-frame delay is 6 and 5 or the corresponding sub-frame delay is 5.

The method further includes the following operations.

When the UL-DL sub-frame configuration 0 is adopted and the retransmission indicator channel is received in the sub-frame 0 or the sub-frame 5, if the retransmission indicator is 0, it is determined that the sub-frame delay corresponding to the sub-frame 0 or the sub-frame 5 is 4, and if the retransmission indicator is 1, it is determined that the sub-frame delay corresponding to the sub-frame 0 or the sub-frame 5 is 7.

When the UL-DL sub-frame configuration 0 is adopted and the retransmission indicator channel is received in the sub-frame 1 or the sub-frame 6, if the retransmission indicator is 0, it is determined that the sub-frame delay corresponding to the sub-frame 1 or the sub-frame 6 is 6, and if the retransmission indicator is 1, it is determined that the sub-frame delay corresponding to the sub-frame 1 or the sub-frame 6 is 7.

The field called UL_INDEX is introduced into the DCI0 in the protocol. The field UL_INDEX includes only two bits with the following specific meanings.

If MSB=1 and LSB=0, it is indicated that the two interaction parties are required to use the rule of (n+k) and, in such case, a resource of a PUSCH is scheduled for a piece of DCI0.

If MSB=0 and LSB=1, it is indicated that the two interaction parties are required to use the rule of (n+7) and, in such case, a resource of a PUSCH is scheduled for a piece of DCI0.

If MSB=1 and LSB=1, it is indicated that the two interaction parties are required to use the rules of (n+k) and (n+7) and, in such case, resources of two PUSCHs are simultaneously scheduled for a piece of DCI0.

If MSB=0 and LSB=0,
for the sub-frame 0 and the sub-frame 5,
a) it is indicated that the two interaction parties are required to use the rules of (n+k), (n+6) and (n+7) and, in such case, resources of three PUSCHs are simultaneously scheduled for a piece of DCI0;
b) it is indicated that the two interaction parties are required to use the rules of (n+6) and (n+7) and, in such case, resources of two PUSCHs are simultaneously scheduled for a piece of DCI0; and
c) it is indicated that the two interaction parties are required to use the rule of (n+6) and, in such case, a resource of a PUSCH is scheduled for a piece of DCI0.

For the sub-frame 1 and the sub-frame 6,
a) it is indicated that the two interaction parties are required to use the rules of (n+k), (n+5) and (n+7) and, in such case, resources of three PUSCHs are simultaneously scheduled for a piece of DCI0;
b) it is indicated that the two interaction parties are required to use the rules of (n+k) and (n+5) and, in such case, resources of two PUSCHs are simultaneously scheduled for a piece of DCI0; and
c) it is indicated that the two interaction parties are required to use the rule of (n+5) and, in such case, a resource of a PUSCH is scheduled for a piece of DCI0.

It is to be noted that the foregoing specific processing manners may be selected according to the practical condition or may be preset by the system.

A Fifth Scenario

When the UL-DL sub-frame configuration 0 is adopted, the MSB in the UL resource indication information is set to be 1 and the LSB is set to be 0, so as to indicate the corresponding UL resource selection rule to be that, when the DL sub-frame is the sub-frame 0 or the sub-frame 5, the corresponding sub-frame delay is 4, and when the DL sub-frame is the sub-frame 1 or the sub-frame 6, the corresponding sub-frame delay is 5.

When the UL-DL sub-frame configuration 0 is adopted, if the UL resource indication information is set in a manner that the MSB in the UL resource indication information is 0 and the LSB is 1, so as to indicate the corresponding UL resource selection rule to be that, when the DL sub-frame is the sub-frame 0, the sub-frame 1, the sub-frame 5 or the sub-frame 6, the corresponding sub-frame delay is 7.

When the UL-DL sub-frame configuration 0 is adopted, the MSB in the UL resource indication information is set to be 1 and the LSB is set to be 1, so as to indicate the corresponding UL resource selection rule to be that, when the DL sub-frame is the sub-frame 0 or the sub-frame 5, the corresponding sub-frame delay is 4 and 7, and when the DL sub-frame is the sub-frame 1 or the sub-frame 6, the corresponding sub-frame delay is 5 and 7.

At most two PUSCHs are scheduled for a UL grant.

For example, for the sub-frame 0, a sub-frame 4 may be scheduled and the sub-frame 7 may also be scheduled. For determining the sub-frame scheduled for it, the following specifications are defined.

A resource for DCI0 may be used in (n+k) and may also be used in (n+7). The field called UL_INDEX is introduced into the DCI0 in the protocol. The field UL_INDEX includes only two bits with the following specific meanings.

If MSB=1 and LSB=0, it is indicated that the two interaction parties are required to use the rule of (n+k) and, in such case, a resource of a PUSCH is scheduled for a piece of DCI0.

If MSB=0 and LSB=1, it is indicated that the two interaction parties are required to use the rule of (n+7) and, in such case, a resource of a PUSCH is scheduled for a piece of DCI0.

If MSB=1 and LSB=1, it is indicated that the two interaction parties are required to use the rules of (n+k) and (n+7) and, in such case, resources of two PUSCHs are simultaneously scheduled for a piece of DCI0.

The method further includes the following operations.

When the UL-DL sub-frame configuration 0 is adopted and the retransmission indicator channel is received in the sub-frame 0 or the sub-frame 5, if the retransmission indicator is 0, it is determined that the sub-frame delay corresponding to the sub-frame 0 or the sub-frame 5 is 4, and if the retransmission indicator is 1, it is determined that the sub-frame delay corresponding to the sub-frame 0 or the sub-frame 5 is 7.

When the UL-DL sub-frame configuration 0 is adopted and the retransmission indicator channel is received in the sub-frame 1 or the sub-frame 6, if the retransmission indicator is 0, it is determined that the sub-frame delay corresponding to the sub-frame 1 or the sub-frame 6 is 5, and if the retransmission indicator is 1, it is determined that the sub-frame delay corresponding to the sub-frame 1 or the sub-frame 6 is 7.

A Sixth Scenario

When a UL-DL sub-frame configuration 6 is adopted, the MSB in the UL resource indication information is set to be 1 and the LSB is set to be 0, or, if the retransmission indicator channel is received in the sub-frame 5 and the retransmission indicator is 0, so as to indicate the corresponding UL resource selection rule to be that, when the DL sub-frame is the sub-frame 5, the corresponding sub-frame delay is 13.

When the UL-DL sub-frame configuration 6 is adopted, the MSB in the UL resource indication information is set to be 0 and the LSB is set to be 1, or, if the retransmission indicator channel is received in the sub-frame 5 and the retransmission indicator is 1, so as to indicate the corresponding UL resource selection rule to be that, when the DL sub-frame is the sub-frame 5, the corresponding sub-frame delay is 16.

When the UL-DL sub-frame configuration 6 is adopted, the MSB in the UL resource indication information is set to be 1 and the LSB is set to be 1, so as to indicate the corresponding UL resource selection rule to be that, when the DL sub-frame is the sub-frame 5, the corresponding sub-frame delay is 16 and 13.

For the Sub-Frame 5

A resource for DCI0 may be used in (n+k) and may also be used in (n+16). The field called UL_INDEX is introduced into the DCI0 in the protocol. The field UL_INDEX includes only two bits with the following specific meanings.

If MSB=1 and LSB=0, or the PHICH is received in the sub-frame 5 and, correspondingly, $I_{PHICH}=0$, it is indicated that the two interaction parties are required to use the rule of (n+k) and, in such case, a resource of a PUSCH is scheduled for a piece of DCI0.

If MSB=0 and LSB=1, or the PHICH is received in the sub-frame 5 and, correspondingly, $I_{PHICH}=1$, it is indicated that the two interaction parties are required to use a rule of (n+16) and, in such case, a resource of a PUSCH is scheduled for a piece of DCI0.

If MSB=1 and LSB=1, it is indicated that the two interaction parties are required to use the rules of (n+k) and (n+16) and, in such case, resources of two PUSCHs are simultaneously scheduled for a piece of DCI0.

When the UL-DL sub-frame configuration 6 is adopted, the MSB in the UL resource indication information is set to be 1 and the LSB is set to be 0, or, if the retransmission indicator channel is received in the sub-frame 9 and the retransmission indicator is 0, so as to indicate the corresponding UL resource selection rule to be that, when the DL sub-frame is the sub-frame 9, the corresponding sub-frame delay is 14.

When the UL-DL sub-frame configuration 6 is adopted, the MSB in the UL resource indication information is set to be 0 and the LSB is set to be 1, or, if the retransmission indicator channel is received in the sub-frame 9 and the retransmission indicator is 1, so as to indicate the corresponding UL resource selection rule to be that, when the DL sub-frame is the sub-frame 9, the corresponding sub-frame delay is 16.

When the UL-DL sub-frame configuration 6 is adopted, the MSB in the UL resource indication information is set to be 1 and the LSB is set to be 1, so as to indicate the corresponding UL resource selection rule to be that, when the DL sub-frame is the sub-frame 9, the corresponding sub-frame delay is 16 and 14.

Specifically, a resource for DCI0 may be used in (n+k) and may also be used in (n+15). The field called UL_INDEX is introduced into the DCI0 in the protocol.

The field UL_INDEX includes only two bits with the following specific meanings.

If MSB=1 and LSB=0, or the PHICH is received in the sub-frame 9 and, correspondingly, $I_{PHICH}=0$ it is indicated that the two interaction parties are required to use the rule of (n+k) and, in such case, a resource of a PUSCH is scheduled for a piece of DCI0.

If MSB=0 and LSB=1, or the PHICH is received in the sub-frame 9 and, correspondingly, $I_{PHICH}=1$, it is indicated that the two interaction parties are required to use a rule of (n+16) and, in such case, a resource of a PUSCH is scheduled for a piece of DCI0.

If MSB=1 and LSB=1, it is indicated that the two interaction parties are required to use the rules of (n+k) and (n+16) and, in such case, resources of two PUSCHs are simultaneously scheduled for a piece of DCI0.

A Seventh Scenario

When the UL-DL sub-frame configuration 6 is adopted, if the DL sub-frame is the sub-frame 0 or the sub-frame 5, it is determined that the corresponding sub-frame delay is 6 and 7, if the DL sub-frame is the sub-frame 1 or the sub-frame 6, it is determined that the corresponding sub-frame delay is 7, and if the DL sub-frame is the sub-frame 9, it is determined that the corresponding sub-frame delay is 5.

The same UL grant is adopted to schedule the PUSCH of the UpPTS and the PUSCH of the UL sub-frame thereafter, that is, the UL grant of the sub-frame is bound together with the UL grant of the sub-frame 7 and the UL grant of the sub-frame 1 is bound together with the UL grant of the sub-frame 2.

In such case, the sub-frame 4 is scheduled for the sub-frame 9, the sub-frames 6 and 7 are scheduled for the sub-frame 0, the sub-frame 8 is scheduled for the sub-frame 1, the sub-frames 1 and 2 are scheduled for the sub-frame 5 and the sub-frame 3 is scheduled for the sub-frame 6. That is, resources of at most two PUSCHs are simultaneously scheduled for a piece of DCI0.

An Eighth Scenario

When the UL-DL sub-frame configuration 6 is adopted, the MSB in the UL resource indication information is set to be 1 and the LSB is set to be 0, or, if the retransmission indicator channel is received in the sub-frame 0 or the sub-frame 5 and the retransmission indicator is 0, so as to indicate the corresponding UL resource selection rule to be that, when the DL sub-frame is the sub-frame 0 or the sub-frame 5, the corresponding sub-frame delay is 7.

When the UL-DL sub-frame configuration 6 is adopted, the MSB in the UL resource indication information is set to be 0 and the LSB is set to be 1, or, if the retransmission indicator channel is received in the sub-frame 0 or the sub-frame 5 and the retransmission indicator is 1, so as to indicate the corresponding UL resource selection rule to be that, when the DL sub-frame is the sub-frame 0 or the sub-frame 5, the corresponding sub-frame delay is 6.

When the UL-DL sub-frame configuration 6 is adopted, the MSB in the UL resource indication information is set to be 1 and the LSB is set to be 1, so as to indicate the corresponding UL resource selection rule to be that, when the DL sub-frame is the sub-frame 0 or the sub-frame 5, the corresponding sub-frame delay is 6 and 7.

At most two PUSCHs are scheduled for a UL grant.

For example, for the sub-frame 0, a sub-frame 6 may be scheduled and the sub-frame 7 may also be scheduled. For determining the sub-frame scheduled for it, the following specifications are defined.

A resource for DCI0 may be used in (n+k) and may also be used in (n+6). The field called UL_INDEX is introduced into the DCI0 in the protocol. The field UL_INDEX includes only two bits with the following specific meanings.

If MSB=1 and LSB=0, or the PHICH is received in the sub-frame 0 or 5 and, correspondingly, $I_{PHICH}=0$, it is indicated that the two interaction parties are required to use the rule of (n+k) and, in such case, a resource of a PUSCH is scheduled for a piece of DCI0.

If MSB=0 and LSB=1, or the PHICH is received in the sub-frame 0 or 5 and, correspondingly, $I_{PHICH}=1$, it is indicated that the two interaction parties are required to use the rule of (n+6) and, in such case, a resource of a PUSCH is scheduled for a piece of DCI0.

If MSB=1 and LSB=1, it is indicated that the two interaction parties are required to use the rules of (n+k) and (n+6) and, in such case, resources of at most two PUSCHs are simultaneously scheduled for a piece of DCI0.

A Ninth Scenario

When a UL-DL sub-frame configuration 1 is adopted, if the DL sub-frame is one of the sub-frame 0, the sub-frame 1, the sub-frame 5 or the sub-frame 6, it is determined that the corresponding sub-frame delay is 6, and if the DL sub-frame is a sub-frame 4 or the sub-frame 9, it is determined that the corresponding sub-frame delay is 4.

When a UL-DL sub-frame configuration 2 is adopted, if the DL sub-frame is the sub-frame 1 or the sub-frame 9, it is determined that the corresponding sub-frame delay is 5, and if the DL sub-frame is the sub-frame 3 or the sub-frame 8, it is determined that the corresponding sub-frame delay is 4.

When a UL-DL sub-frame configuration 3 is adopted, if the DL sub-frame is one of the sub-frame 0, a sub-frame 7, the sub-frame 8 or the sub-frame 9, it is determined that the corresponding sub-frame delay is 4.

When a UL-DL sub-frame configuration 4 is adopted, if the DL sub-frame is one of the sub-frame 7, the sub-frame 8 or the sub-frame 9, it is determined that the corresponding sub-frame delay is 4.

When a UL-DL sub-frame configuration 5 is adopted, if the DL sub-frame is the sub-frame 7 or the sub-frame 8, it is determined that the corresponding sub-frame delay is 4.

Third Embodiment

Figure 5:
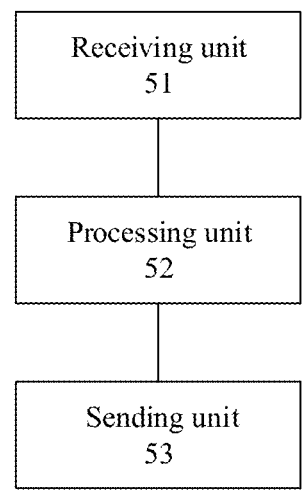
FIG. 5 is a composition structure diagram of UE according to an embodiment of the disclosure.

The embodiment provides UE, which, as shown in FIG. 5, includes a receiving unit 51, a processing unit 52 and a sending unit 53.

The receiving unit 51 is configured to receive UL grant information or retransmission indication information sent from an eNB side.

The processing unit 52 is configured to determine at least one corresponding sub-frame delay corresponding to a serial number of a DL sub-frame containing the UL grant information or the retransmission indication information and determine at least one UL resource on the basis of the at least one sub-frame delay, the UL resource being at least one of a UL sub-frame or an UpPTS in a special sub-frame.

The sending unit 53 is configured to perform UL shared channel transmission in the at least one UL resource.

Functions executed by the UE provided in the embodiment are as described in the first embodiment. For example, the receiving unit is configured to parse DCI and extract UL resource indication information and the UL grant information from the DCI, the UL resource indication information being configured to indicate a UL resource selection rule adopted by the UE.

The processing unit is specifically configured to determine the UL resource selection rule, including various scenarios mentioned in the first embodiment. No more elaborations will be made herein. In addition, the processing unit is further configured to determine a receiving sub-frame position for a PHICH sent from an eNB. A processing manner is the same as that in the first embodiment and will not be elaborated herein.

Fourth Embodiment

Figure 6:
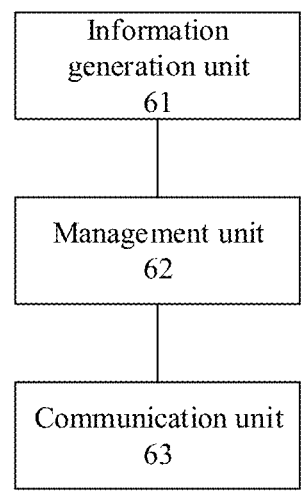
FIG. 6 is a composition structure diagram of an eNB according to an embodiment of the disclosure.

The embodiment provides an eNB, which, as shown in FIG. 6, includes an information generation unit 61, a management unit 62 and a communication unit 63.

The information generation unit 61 is configured to generate UL grant information or retransmission indication information for UE.

The management unit 62 is configured to determine a serial number of a DL sub-frame for sending the UL grant information or retransmission indication information, determine at least one corresponding sub-frame delay corresponding to the serial number of the DL sub-frame and determine at least one UL resource on the basis of the at least one sub-frame delay, the UL resource being at least one of a UL sub-frame or an UpPTS in a special sub-frame.

The communication unit 63 is configured to send the UL grant information to the UE in the DL sub-frame and receive, in the at least one UL resource, UL shared channel transmission sent from the UE.

The management unit in the embodiment is mainly configured to execute various scenarios mentioned in the second embodiment, which will not be elaborated herein.

UE in the embodiments of the disclosure may include one or more (only one shown in the figure) processors, a memory and a transmission device (for example, a sending device in the abovementioned embodiment). The UE may further include an input/output device.

Herein, the memory may be configured to store a software program and a module, for example, a program instruction/module corresponding to a media file processing method and device in the embodiments of the disclosure. The processor runs the software program and module stored in the memory, thereby executing various functional applications and data processing, namely implementing the media file processing method.

The memory may include a high-speed Random Access Memory (RAM) and may also include a nonvolatile memory, for example, one or more magnetic storage devices, flash memories or other nonvolatile solid-state memories. In some embodiments, the memory may further include a memory arranged remotely relative to the processor and the remote memory may be connected to a terminal through a network. An example of the network includes, but not limited to, the Internet, an intranet, a local area network, a mobile communication network and a combination thereof.

The transmission device is configured to receive or send data through a network and may further be configured for data transmission between the processor and the memory. A specific example of the network may include a wired network and a wireless network. In an example, the transmission device includes a Network Interface Controller (NIC), which may be connected with another network device and a router through a cable, thereby communicating with the Internet or the local area network. In an example, the transmission device 2505 is a Radio Frequency (RF) module, configured to communicate with the Internet in a wireless manner.

Herein, the memory is specifically configured to store applications.

The processor may call an application stored in the memory through the transmission device to execute the following steps.

UL grant information or retransmission indication information sent from an eNB side is received.

At least one corresponding sub-frame delay is determined on the basis of a serial number of a DL sub-frame containing the UL grant information or the retransmission indication information, and at least one UL resource is determined on the basis of the at least one sub-frame delay, the UL resource being at least one of a UL sub-frame or an UpPTS in a special sub-frame.

A UL shared channel transmission is performed in the at least one UL resource.

It is to be pointed out that the processor in the UE may further execute the method flow provided in the first embodiment.

In addition, an eNB may also include one or more (only one shown in the figure) processors, a memory, a transmission device (for example, a sending device in the abovementioned embodiment) and an input/output device.

Herein, the memory is specifically configured to store applications.

The processor may call an application stored in the memory through the transmission device to execute the following steps.

UL grant information for UE is generated.

A serial number of a DL sub-frame for sending the UL grant information or retransmission indication information is determined, at least one corresponding sub-frame delay is determined on the basis of the serial number of the DL sub-frame, and at least one UL resource is determined on the basis of the at least one sub-frame delay, the UL resource being at least one of a UL sub-frame or an UpPTS in a special sub-frame.

The UL grant information or the retransmission indication information is sent to the UE in the DL sub-frame, and UL shared channel transmission sent from the UE is received in the at least one UL resource.

It is to be pointed out that the processor in the user equipment may further execute the method flow provided in the second embodiment.

An embodiment of the disclosure also provides a storage medium, which includes a set of instructions. The instructions are executed to cause at least one processor to execute the following operations.

UL grant information for UE is generated.

A serial number of a DL sub-frame for sending the UL grant information or retransmission indication information is determined, at least one corresponding sub-frame delay is determined on the basis of the serial number of the DL sub-frame, and at least one UL resource is determined on the basis of the at least one sub-frame delay, the UL resource being at least one of a UL sub-frame or an UpPTS in a special sub-frame.

The UL grant information or the retransmission indication information is sent to the UE in the DL sub-frame, and UL shared channel transmission sent from the UE is received in the at least one UL resource.

Or, the following processing may be executed. UL grant information or retransmission indication information sent from an eNB side is received.

At least one corresponding sub-frame delay is determined on the basis of a serial number of a DL sub-frame containing the UL grant information or the retransmission indication information, and at least one UL resource is determined on the basis of the at least one sub-frame delay, the UL resource being at least one of a UL sub-frame or an UpPTS in a special sub-frame.

A UL shared channel transmission is performed in the at least one UL resource.

It is to be noted that terms "include" and "contain" in the disclosure or any other variant thereof is intended to cover nonexclusive inclusions, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The sequence numbers of the embodiments of the disclosure are adopted not to represent superiority-inferiority of the embodiments but only for description.

From the above descriptions about the implementation modes, those skilled in the art may clearly know that the method of the abovementioned embodiments may be implemented in a manner of combining software and a necessary universal hardware platform, and of course, may also be implemented through hardware, but the former is a preferred implementation mode under many circumstances. Based on such an understanding, the technical solutions of the disclosure substantially or parts making contributions to the conventional art may be embodied in form of software product, and the computer software product is stored in a storage medium (for example, a Read-Only Memory (ROM)/RAM, a magnetic disk and an optical disk), including a plurality of instructions configured to enable a computer device (which may be a personal computer, a server, a conditioner, a network device or the like) to execute the method in each embodiment of the disclosure.

The above are only the preferred embodiments of the disclosure and not thus intended to limit the scope of protection of the disclosure. Any equivalent structure or equivalent flow transformations made by use of the contents of the specification and drawings of the disclosure or direct or indirect application to other related technical fields shall also fall within the scope of protection of the disclosure.

The invention claimed is:

1. A message transmission method, applied to User Equipment (UE), comprising:
    receiving Uplink (UL) grant information or retransmission indication information sent from an Evolved Node B (eNB) side;
    determining at least one sub-frame delay corresponding to a serial number of a Downlink (DL) sub-frame containing the UL grant information or the retransmission indication information, and determining at least one UL resource on the basis of the at least one sub-frame delay, the UL resource being an Uplink Pilot Time Slot (UpPTS) in a special sub-frame or being a UL sub-frame and a UpPTS in a special sub-frame; and
    performing UL shared channel transmission in the at least one UL resource;
    wherein determining the at least one UL resource on the basis of the at least one sub-frame delay further comprises:
    when the determined UL resource is the UpPTS of the special sub-frame,
    calculating a number of Physical Resource Blocks (PRBs) allocated in the UpPTS and calculating an equivalent number of PRBs corresponding to the number of PRBs, the equivalent number of PRBs being a product of the number of PRBs and a preset coefficient; and
    searching a data block size index on the basis of a modulation and coding scheme index and calculating a value of the number of UL data blocks on the basis of the equivalent number of PRBs and the data block size index.

2. The method of claim 1, wherein the special sub-frame at least comprises the UpPTS and a Downlink Pilot Time Slot (DwPTS); the DwPTS comprises 13,168 time-domain sampling points; when a normal cyclic prefix is adopted, the UpPTS comprises 13,152 time-domain sampling points, or when an extended cyclic prefix is adopted, the UpPTS comprises 12,800 time-domain sampling points; and a time interval between two time-domain sampling points is 1/(15, 000*2,048) seconds.

3. The method of claim 1, wherein determining the at least one corresponding sub-frame delay corresponding to the serial number of the DL sub-frame containing the UL grant information or the retransmission indication information comprises:
    when a UL-DL sub-frame configuration 1 is adopted, if the DL sub-frame is one of a sub-frame 0, a sub-frame 1, a sub-frame 5 or a sub-frame 6, determining that the corresponding sub-frame delay is 6, and if the DL sub-frame is a sub-frame 4 or a sub-frame 9, determining that the corresponding sub-frame delay is 4;
    when a UL-DL sub-frame configuration 2 is adopted, if the DL sub-frame is the sub-frame 1 or the sub-frame 6, determining that the corresponding sub-frame delay is 5, and if the DL sub-frame is a sub-frame 3 or a sub-frame 8, determining that the corresponding sub-frame delay is 4;

when a UL-DL sub-frame configuration 3 is adopted, if the DL sub-frame is one of the sub-frame 0, a sub-frame 7, the sub-frame 8 or the sub-frame 9, determining that the corresponding sub-frame delay is 4;

when a UL-DL sub-frame configuration 4 is adopted, if the DL sub-frame is one of the sub-frame 7, the sub-frame 8 or the sub-frame 9, determining that the corresponding sub-frame delay is 4; or when a UL-DL sub-frame configuration 5 is adopted, if the DL sub-frame is the sub-frame 7 or the sub-frame 8, determining that the corresponding sub-frame delay is 4.

4. The method of claim 1, wherein receiving the UL grant information sent from the eNB side comprises:

parsing Downlink Control Information (DCI) and extracting UL resource indication information and the UL grant information from the DCI, the UL resource indication information being configured to indicate a UL resource selection rule adopted by the UE.

5. The method of claim 4, wherein determining the at least one corresponding sub-frame delay corresponding to the serial number of the DL sub-frame containing the UL grant information and determining the at least one UL resource on the basis of the at least one sub-frame delay comprises:

determining the adopted UL resource selection rule on the basis of the UL resource indication information, the UL resource selection rule at least comprising: a sub-frame corresponding to the UL resource indication information, and the at least one sub-frame delay corresponding to each sub-frame; and determining the at least one UL resource on the basis of the serial number of the DL sub-frame containing the UL grant information and the at least one corresponding sub-frame delay comprised in the UL resource selection rule.

6. The method of claim 5, wherein determining the adopted UL resource selection rule on the basis of the UL resource indication information comprises:

when a UL-DL sub-frame configuration 0 is adopted, if a Most Significant Bit (MSB) in the UL resource indication information is 1 and a Least Significant Bit (LSB) is 0, determining the UL resource selection rule to be that, when the DL sub-frame is the sub-frame 0 or the sub-frame 5, the corresponding sub-frame delay is 4, and when the DL sub-frame is the sub-frame 1 or the sub-frame 6, the corresponding sub-frame delay is 5;

when the UL-DL sub-frame configuration 0 is adopted, if the MSB in the UL resource indication information is 0 and the LSB is 1, determining the UL resource selection rule to be that, when the DL sub-frame is the sub-frame 0, the sub-frame 1, the sub-frame 5 or the sub-frame 6, the corresponding sub-frame delay is 7; and when the UL-DL sub-frame configuration 0 is adopted, if the MSB in the UL resource indication information is 1 and the LSB is 1, determining the UL resource selection rule to be that, when the DL sub-frame is the sub-frame 0 or the sub-frame 5, the corresponding sub-frame delay is 4 and 7, and when the DL sub-frame is the sub-frame 1 or the sub-frame 6, the corresponding sub-frame delay is 5 and 7.

7. The method of claim 5, further comprising:

when a UL-DL sub-frame configuration 0 is adopted and the retransmission indicator channel is received in the sub-frame 0 or the sub-frame 5, if the retransmission indicator is 0, determining that the sub-frame delay corresponding to the sub-frame 0 or the sub-frame 5 is 4, and if the retransmission indicator is 1, determining that the sub-frame delay corresponding to the sub-frame 0 or the sub-frame 5 is 7; and when the UL-DL sub-frame configuration 0 is adopted and the retransmission indicator channel is received in the sub-frame 1 or the sub-frame 6, if the retransmission indicator is 0, determining that the sub-frame delay corresponding to the sub-frame 1 or the sub-frame 6 is 5, and if the retransmission indicator is 1, determining that the sub-frame delay corresponding to the sub-frame 1 or the sub-frame 6 is 7.

8. The method of claim 7, further comprising:

responsive to determining that the UL shared channel transmission is performed in a UL resource of the sub-frame 2 or the sub-frame 4 or the sub-frame 7 or the sub-frame 9, setting the retransmission indicator to be 1, otherwise, setting the retransmission indicator to be 0.

9. The method of claim 5, wherein determining the adopted UL resource selection rule on the basis of the UL resource indication information comprises:

when a UL-DL sub-frame configuration 6 is adopted, if a Most Significant Bit (MSB) in the UL resource indication information is 1 and a Least Significant Bit (LSB) is 0, or, if the retransmission indicator channel is received in the sub-frame 0 or the sub-frame 5 and the retransmission indicator is 0, determining the UL resource selection rule to be that, when the DL sub-frame is the sub-frame 0 or the sub-frame 5, the corresponding sub-frame delay is 7;

when the UL-DL sub-frame configuration 6 is adopted, if the MSB in the UL resource indication information is 0 and the LSB is 1, or, if the retransmission indicator channel is received in the sub-frame 0 or the sub-frame 5 and the retransmission indicator is 1, determining the UL resource selection rule to be that, when the DL sub-frame is the sub-frame 0 or the sub-frame 5, the corresponding sub-frame delay is 6; and when the UL-DL sub-frame configuration 6 is adopted, if the MSB in the UL resource indication information is 1 and the LSB is 1, determining the UL resource selection rule to be that, when the DL sub-frame is the sub-frame 0 or the sub-frame 5, the corresponding sub-frame delay is 7 and 6.

10. The method of claim 9, further comprising:

responsive to determining that the UL shared channel transmission is performed in a UL resource of the sub-frame 1 or the sub-frame 6, setting a retransmission indicator to be 1, otherwise, setting the retransmission indicator to be 0.

11. The method of claim 1, after performing the UL shared channel transmission in the at least one UL resource, further comprising:

when a UL-DL sub-frame configuration 0 is adopted, if the UL shared channel transmission is performed in one of the sub-frame 1 or the sub-frame 6, determining that the sub-frame delay for reception of a retransmission indicator channel is 5, if the UL shared channel transmission is performed in one of the sub-frame 2 or the sub-frame 7, determining that the corresponding sub-frame delay for reception of the retransmission indicator channel is 4, if the UL shared channel transmission is performed in the sub-frame 3 or the sub-frame 8, determining that the corresponding sub-frame delay for reception of the retransmission indicator channel is 7, and if the UL shared channel transmission is performed in the sub-frame 4 or 9, determining that the corresponding sub-frame delay for reception of the retransmission indicator channel is 6; and when the UL-DL sub-frame configuration 6 is adopted, if the UL shared channel transmission is performed in one of the sub-frame 1, the sub-frame 2, the sub-frame 6 or the sub-frame 7, determining that the corresponding sub-frame delay for reception of the retransmission indicator channel is 4, if the UL shared channel transmission is performed in the sub-frame 3 or the sub-frame 4, determining that the corresponding sub-frame delay for reception of the retransmission indicator channel is 6, and if the UL shared channel transmission is performed in the sub-frame 8, determining that the corresponding sub-frame delay for reception of the retransmission indicator channel is 7.

12. A message transmission method, applied to an Evolved Node B (eNB), comprising:

generating Uplink (UL) grant information for User Equipment (UE);

determining a serial number of a Downlink (DL) sub-frame for sending the UL grant information or retransmission indication information, determining at least one corresponding sub-frame delay corresponding to the serial number of the DL sub-frame and determining at least one UL resource on the basis of the at least one sub-frame delay, the UL resource being an Uplink Pilot Time Slot (UpPTS) in a special sub-frame or being a UL sub-frame and a UpPTS in a special sub-frame; and sending the UL grant information or the retransmission indication information to the UE in the DL sub-frame and receiving, in the at least one UL resource, UL shared channel transmission sent from the UE, wherein the UE performs the following steps:

determining the at least one UL resource on the basis of the at least one sub-frame delay comprises:

when the determined UL resource is the UpPTS of the special sub-frame, calculating a number of Physical Resource Blocks (PRBs) allocated in the UpPTS and calculating an equivalent number of PRBs corresponding to the number of PRBs, the equivalent number of PRBs being a product of the number of PRBs and a preset coefficient; and searching a data block size index on the basis of a modulation and coding scheme index and calculating a value of the number of UL data blocks on the basis of the equivalent number of PRBs and the data block size index.

13. The method of claim 12, wherein sending the UL grant information to the UE in the DL sub-frame comprises:

adding UL resource indication information and the UL grant information into Downlink Control Information (DCI) and sending the DCI to the UE in the DL sub-frame, the UL resource indication information being configured to indicate a UL resource selection rule adopted by the UE.

14. The method of claim 13, further comprising:

when a UL-DL sub-frame configuration 0 is adopted, setting an MSB in the UL resource indication information to be 1 and an LSB to be 0, so as to indicate the corresponding UL resource selection rule to be that, when the DL sub-frame is the sub-frame 0 or the sub-frame 5, the corresponding sub-frame delay is 4, and when the DL sub-frame is the sub-frame 1 or the sub-frame 6, the corresponding sub-frame delay is 5;

when the UL-DL sub-frame configuration 0 is adopted, if the UL resource indication information is set in a manner that the MSB in the UL resource indication information is 0 and the LSB is 1, so as to indicate the corresponding UL resource selection rule to be that, when the DL sub-frame is the sub-frame 0, the sub-frame 1, the sub-frame 5 or the sub-frame 6, the corresponding sub-frame delay is 7; and when the UL-DL sub-frame configuration 0 is adopted, setting the MSB in the UL resource indication information to be 1 and the LSB to be 1, so as to indicate the corresponding UL resource selection rule to be that, when the DL sub-frame is the sub-frame 0 or the sub-frame 5, the corresponding sub-frame delay is 4 and 7, and when the DL sub-frame is the sub-frame 1 or the sub-frame 6, the corresponding sub-frame delay is 5 and 7.

15. The method of claim 13, further comprising:

when a UL-DL sub-frame configuration 0 is adopted and the retransmission indicator channel is received in the sub-frame 0 or the sub-frame 5, if the retransmission indicator is 0, determining that the sub-frame delay corresponding to the sub-frame 0 or the sub-frame 5 is 4, and if the retransmission indicator is 1, determining that the sub-frame delay corresponding to the sub-frame 0 or the sub-frame 5 is 7; and when the UL-DL sub-frame configuration 0 is adopted and the retransmission indicator channel is received in the sub-frame 1 or the sub-frame 6, if the retransmission indicator is 0, determining that the sub-frame delay corresponding to the sub-frame 1 or the sub-frame 6 is 5, and if the retransmission indicator is 1, determining that the sub-frame delay corresponding to the sub-frame 1 or the sub-frame 6 is 7.

16. The method of claim 13, further comprising:

when a UL-DL sub-frame configuration 6 is adopted, setting an MSB in the UL resource indication information to be 1 and an LSB to be 0, or, if the retransmission indicator channel is received in the sub-frame 0 or the sub-frame 5 and the retransmission indicator is 0, so as to indicate the corresponding UL resource selection rule to be that, when the DL sub-frame is the sub-frame 0 or the sub-frame 5, the corresponding sub-frame delay is 7;

when the UL-DL sub-frame configuration 6 is adopted, setting the MSB in the UL resource indication information to be 0 and the LSB to be 1, or, if the retransmission indicator channel is received in the sub-frame 0 or the sub-frame 5 and the retransmission indicator is 1, so as to indicate the corresponding UL resource selection rule to be that, when the DL sub-frame is the sub-frame 0 or the sub-frame 5, the corresponding sub-frame delay is 6; and when the UL-DL sub-frame configuration 6 is adopted, setting the MSB in the UL resource indication information to be 1 and the LSB to be 1, so as to indicate the corresponding UL resource selection rule to be that, when the DL sub-frame is the sub-frame 0 or the sub-frame 5, the corresponding sub-frame delay is 6 and 7.

17. The method of claim 13, further comprising:

when a UL-DL sub-frame configuration 1 is adopted, if the DL sub-frame is one of the sub-frame 0, the sub-frame 1, the sub-frame 5 or the sub-frame 6, determining that the corresponding sub-frame delay is 6, and if the DL sub-frame is a sub-frame 4 or the sub-frame 9, determining that the corresponding sub-frame delay is 4;

when a UL-DL sub-frame configuration 2 is adopted, if the DL sub-frame is the sub-frame 1 or the sub-frame 6, determining that the corresponding sub-frame delay is 5, and if the DL sub-frame is a sub-frame 3 or a sub-frame 8, determining that the corresponding sub-frame delay is 4;

when a UL-DL sub-frame configuration 3 is adopted, if the DL sub-frame is one of the sub-frame 0, a sub-frame 7, the sub-frame 8 or the sub-frame 9, determining that the corresponding sub-frame delay is 4;

when a UL-DL sub-frame configuration 4 is adopted, if the DL sub-frame is one of the sub-frame 7, the sub-frame 8 or the sub-frame 9, determining that the corresponding sub-frame delay is 4; and when a UL-DL sub-frame configuration 5 is adopted, if the DL sub-frame is the sub-frame 7 or the sub-frame 8, determining that the corresponding sub-frame delay is 4.

18. The method of claim 12, further comprising: after sending the retransmission indication information to the UE in the DL sub-frame, when a UL-DL sub-frame configuration 0 is adopted, if the UL shared channel transmission is performed in one of the sub-frame 1 or the sub-frame 6, determining that the corresponding sub-frame delay for reception of the retransmission indicator channel is 5, if the UL shared channel transmission is performed in one of the sub-frame 2 or the sub-frame 7, determining that the corresponding sub-frame delay for sending of the retransmission indicator channel is 4, if the UL shared channel transmission is performed in the sub-frame 3 or the sub-frame 8, determining that the corresponding sub-frame delay for sending of the retransmission indicator channel is 7, and if the UL shared channel transmission is performed in the sub-frame 4 or 9, determining that the corresponding sub-frame delay for sending of the retransmission indicator channel is 6; and when a UL-DL sub-frame configuration 6 is adopted, if the UL shared channel transmission is performed in one of the sub-frame 1, the sub-frame 2, the sub-frame 6 or the sub-frame 7, determining that the corresponding sub-frame delay for sending of the retransmission indicator channel is 4, if the UL shared channel transmission is performed in the sub-frame 3 or the sub-frame 4, determining that the corresponding sub-frame delay for sending of the retransmission indicator channel is 6, and if the UL shared channel transmission is performed in the sub-frame 8, determining that the corresponding sub-frame delay for sending of the retransmission indicator channel is 7.

19. User Equipment (UE), comprising a processor and a memory configured to store a computer program capable of being run on the processor, wherein the processor is configured to run the computer program to execute steps of a message transmission method, comprising:

receiving Uplink (UL) grant information or retransmission indication information sent from an Evolved Node B (eNB) side;

determining at least one corresponding sub-frame delay corresponding to a serial number of a Downlink (DL) sub-frame containing the UL grant information or the retransmission indication information, and determining at least one UL resource on the basis of the at least one sub-frame delay, the UL resource being an Uplink Pilot Time Slot (UpPTS) in a special sub-frame or being a UL sub-frame and a UpPTS in a special sub-frame; and performing UL shared channel transmission in the at least one UL resource;

wherein the processor is further configured to:

when the determined UL resource is the UpPTS of the special sub-frame, calculate a number of Physical Resource Blocks (PRBs) allocated in the UpPTS and calculate an equivalent number of PRBs corresponding to the number of PRBs, the equivalent number of PRBs being a product of the number of PRBs and a preset coefficient; and search a data block size index on the basis of a modulation and coding scheme index and calculate a value of the number of UL data blocks on the basis of the equivalent number of PRBs and the data block size index.

* * * * *